US012707468B2

(12) United States Patent
Lu et al.

(10) Patent No.: US 12,707,468 B2
(45) Date of Patent: Aug. 11, 2026

(54) UPLINK CONTROL INFORMATION UCI TRANSMISSION METHOD AND APPARATUS, USER EQUIPMENT, AND MEDIUM

(71) Applicant: VIVO MOBILE COMMUNICATION CO., LTD., Dongguan (CN)

(72) Inventors: Zhi Lu, Dongguan (CN); Xueming Pan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 312 days.

(21) Appl. No.: 18/388,245

(22) Filed: Nov. 9, 2023

(65) Prior Publication Data

US 2024/0080844 A1 Mar. 7, 2024

Related U.S. Application Data

(63) Continuation of application No. PCT/CN2022/091940, filed on May 10, 2022.

(30) Foreign Application Priority Data

May 10, 2021 (CN) ......................... 202110507912.8

(51) Int. Cl.
*H04L 5/00* (2006.01)
*H04L 1/1829* (2023.01)
(Continued)

(52) U.S. Cl.
CPC ........... *H04W 72/21* (2023.01); *H04L 1/1854* (2013.01); *H04L 1/1861* (2013.01);
(Continued)

(58) Field of Classification Search
CPC ............... H04W 72/21; H04W 72/569; H04W 72/0446; H04L 1/1854; H04L 1/1861;
(Continued)

(56) References Cited

U.S. PATENT DOCUMENTS 11,570,786 B2 1/2023 Lin et al.
12,356,374 B2 * 7/2025 Hu ........................ H04L 5/0094
(Continued)

FOREIGN PATENT DOCUMENTS

CN 111314033 A 6/2020
CN 111757487 A 10/2020
(Continued)

OTHER PUBLICATIONS

Huawei et al., "Intra-UE multiplexing enhancements", 3GPP TSG RAN WG1 Meeting #103-e, E-meeting, Oct. 26-Nov. 13, 2020, R1-2007567 (Year: 2020).*
(Continued)

*Primary Examiner* — Lan-Huong Truong
(74) *Attorney, Agent, or Firm* — The Webb Law Firm

(57) ABSTRACT

An uplink control information transmission method includes in a case that N uplink channels overlap on a time domain resource, transmitting, by UE, M pieces of UCI to-be-carried on the N uplink channels on a target uplink channel in the N uplink channels. Both N and M are positive integers; and the target uplink channel is determined based on at least one of following: priorities of the N uplink channels, or channel types of the N uplink channels.

15 Claims, 4 Drawing Sheets

A UCI transmission apparatus receives P pieces of UCI from a network side device — 101

In a case that N uplink channels overlap on a time domain resource and a third condition is met, the UCI transmission apparatus cancels UCI transmission on a first uplink channel — 301

The UCI transmission apparatus transmits M pieces of UCI on a target uplink channel in the N uplink channels — 102b

(51) Int. Cl.

| | |
|---|---|
| ***H04W 72/21*** | (2023.01) |
| ***H04W 72/566*** | (2023.01) |
| *H04L 1/1812* | (2023.01) |

(52) U.S. Cl.
CPC ......... *H04L 5/0053* (2013.01); *H04W 72/569* (2023.01); *H04L 1/1812* (2013.01)

(58) Field of Classification Search
CPC ... H04L 5/0053; H04L 1/1812; H04L 1/1671; H04L 5/00; H04L 5/0055; H04L 5/0057
See application file for complete search history.

(56) References Cited

U.S. PATENT DOCUMENTS

| | | | |
|---|---|---|---|
| 2020/0367261 A1* | 11/2020 | Huang | H04L 5/0044 |
| 2021/0058919 A1 | 2/2021 | Takeda et al. | |
| 2021/0058922 A1 | 2/2021 | Han et al. | |
| 2021/0105766 A1 | 4/2021 | Wang et al. | |
| 2021/0321394 A1 | 10/2021 | Li et al. | |
| 2022/0015092 A1 | 1/2022 | Li et al. | |
| 2022/0132496 A1 | 4/2022 | Lu et al. | |
| 2022/0150918 A1 | 5/2022 | Xu et al. | |
| 2022/0353884 A1 | 11/2022 | Gao et al. | |
| 2023/0292339 A1 | 9/2023 | Zhang et al. | |
| 2024/0196426 A1* | 6/2024 | Gao | H04L 5/0053 |

FOREIGN PATENT DOCUMENTS

| | | |
|---|---|---|
| CN | 111835480 A | 10/2020 |
| CN | 111934822 A | 11/2020 |
| CN | 112351495 A | 2/2021 |
| WO | 2021012284 A1 | 1/2021 |
| WO | 2021016774 A1 | 2/2021 |

OTHER PUBLICATIONS

Ericsson, "Intra-UE Mutlplexing/Prioritzation Enhancements for IIoT/URLLC", 3GPP TSG RAN WG1 #104-bis-e, e-Meeting, Apr. 12-20, 2021, Tdoc R1-2102747 (Year: 2021).*

Qualcomm Incorporated, Summary of UCI multiplexing on PUSCH, 3GPP TSG RAN WG1 Meeting #94bis, R1-1811917, Oct. 8-12, 2018, Chengdu, Chin (Year: 2018).*

Apple Inc., "Views on Intra-UE Multiplexing/Prioritization", 3 GPP TSG-RAN WG1 Meeting #104b-e, e-Meeting, Apr. 12-20, 2021, R1-2103106.

Ericsson, "Intra-UE Mutlplexing/Prioritzation Enhancements for IIoT/URLLC", 3GPP TSG RAN WG1 #104-bis-e, e-Meeting, Apr. 12-20, 2021, Tdoc R1-2102747.

Huawei et al., "Intra-UE multiplexing enhancements", 3GPP TSG RAN WG1 Meeting #103-e, E-meeting, Oct. 26-Nov. 13, 2020, R1-2007567.

* cited by examiner

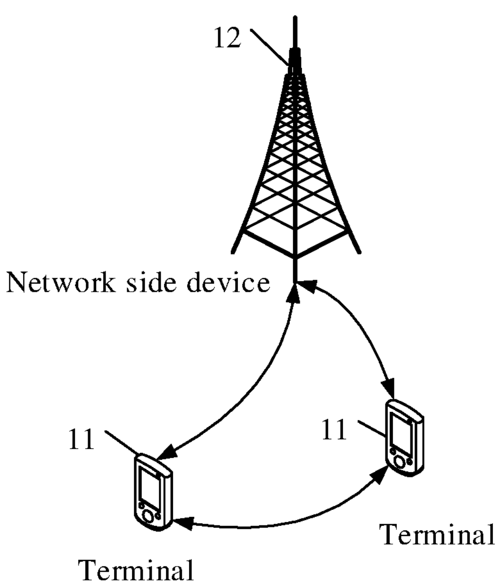
FIG. 1
A UCI transmission apparatus receives P pieces of UCI from a network side device (101)
In a case that N uplink channels overlap on a time domain resource, the UCI transmission apparatus transmits M pieces of UCI to-be-carried on the N uplink channels on a target uplink channel in the N uplink channels (102)
FIG. 2
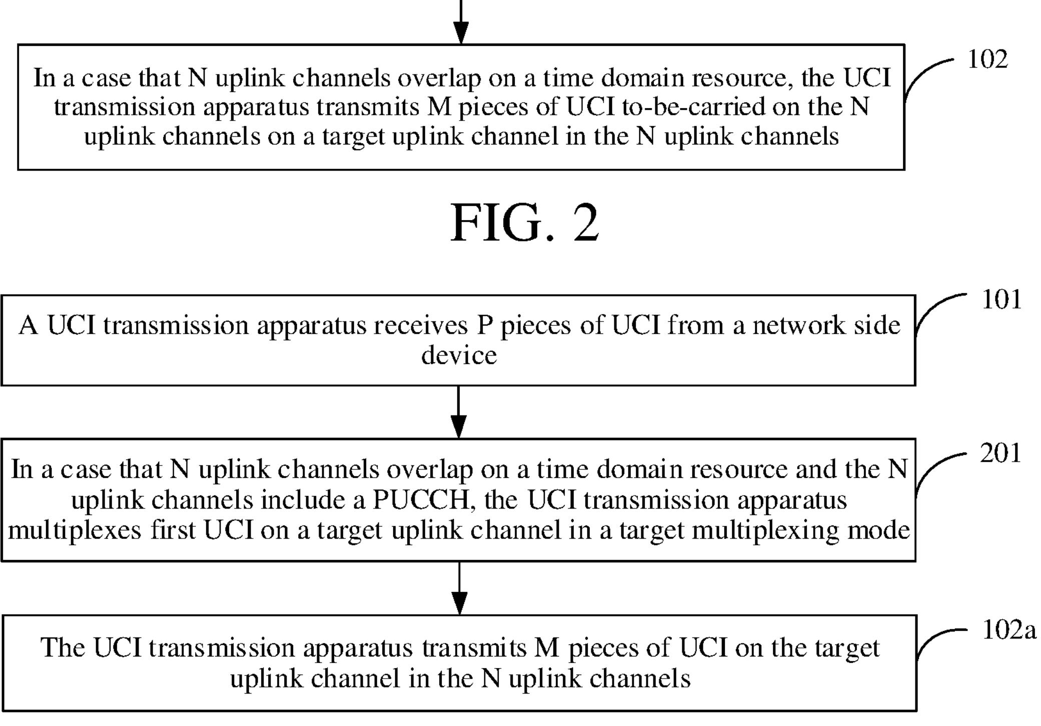
FIG. 3

70

Communications device

71 Processor Memory 72

UPLINK CONTROL INFORMATION UCI TRANSMISSION METHOD AND APPARATUS, USER EQUIPMENT, AND MEDIUM

CROSS-REFERENCE TO RELATED APPLICATIONS

This application is a Bypass Continuation Application of International Patent Application No. PCT/CN2022/091940, filed May 10, 2022, and claims priority to Chinese Patent Application No. 202110507912.8, filed May 10, 2021, the disclosures of which are hereby incorporated by reference in their entireties.

BACKGROUND OF THE INVENTION

Field of the Invention

This application belongs to the field of communications technologies, and specifically, relates to an uplink control information UCI transmission method and apparatus, user equipment, and a medium.

Description of Related Art

Currently, in a new radio (NR) system, user equipment (UE) can support services in a plurality of different scenarios, for example, an enhanced mobile broadband (eMBB) service, an ultra-reliable and low latency communications (URLLC) service, and a massive machine type communication (mMTC) service, to meet service requirements of users in different scenarios.

However, the services in different scenarios have different scheduling periods and transmission duration. Therefore, during transmission of a service (for example, the eMBB service) of the UE, another service may also need to be transmitted. As a result, an uplink channel, on a time domain resource, that carries uplink control information (UCI) of the eMBB service may overlap an uplink channel that carries UCI of the another service. Consequently, the UE cancels transmission of UCI of a service.

Therefore, UCI transmission reliability of the UE is low.

SUMMARY OF THE INVENTION

Embodiments of this application provide a UCI transmission method and apparatus, user equipment, and a medium.

According to a first aspect, a UCI transmission method is provided. The method is applied to UE, and includes: in a case that N uplink channels overlap on a time domain resource, transmitting, by the UE, M pieces of UCI to-be-carried on the N uplink channels on a target uplink channel in the N uplink channels, where both N and M are positive integers; and the target uplink channel is determined based on at least one of the following: priorities of the N uplink channels, or channel types of the N uplink channels.

According to a second aspect, a UCI transmission apparatus is provided. The UCI transmission apparatus includes a transmission module, where the transmission module is configured to: in a case that N uplink channels overlap on a time domain resource, transmit M pieces of UCI to-be-carried on the N uplink channels on a target uplink channel in the N uplink channels, where both N and M are positive integers; and the target uplink channel is determined based on at least one of the following: priorities of the N uplink channels, or channel types of the N uplink channels.

According to a third aspect, UE is provided, where the UE includes a processor, a memory, and a program or instructions stored in the memory and executable on the processor, and when the program or instructions are executed by the processor, the steps of the method according to the first aspect are implemented.

According to a fourth aspect, UE is provided, including a processor and a communications interface, where the communications interface is configured to: in a case that N uplink channels overlap on a time domain resource, transmit M pieces of UCI to-be-carried on the N uplink channels on a target uplink channel in the N uplink channels, where both N and M are positive integers; and the target uplink channel is determined based on at least one of the following: priorities of the N uplink channels, or channel types of the N uplink channels.

According to a fifth aspect, a non-transitory readable storage medium is provided, where the non-transitory readable storage medium stores a program or instructions, and when the program or instructions are executed by a processor, the steps of the method according to the first aspect are implemented.

According to a sixth aspect, a chip is provided, where the chip includes a processor and a communications interface, the communications interface is coupled to the processor, and the processor is configured to run a program or instructions, to implement the method according to the first aspect.

According to a seventh aspect, a computer program or program product is provided, where the computer program or program product is stored in a non-volatile storage medium, and the program or program product is executed by at least one processor to implement the steps of the method according to the first aspect.

BRIEF DESCRIPTION OF THE DRAWINGS

FIG. 1 is a block diagram of a wireless communications system according to an embodiment of this application;

FIG. 2 is a first schematic diagram of a UCI transmission method according to an embodiment of this application;

FIG. 3 is a second schematic diagram of a UCI transmission method according to an embodiment of this application;

DESCRIPTION OF THE INVENTION

Figure 4:
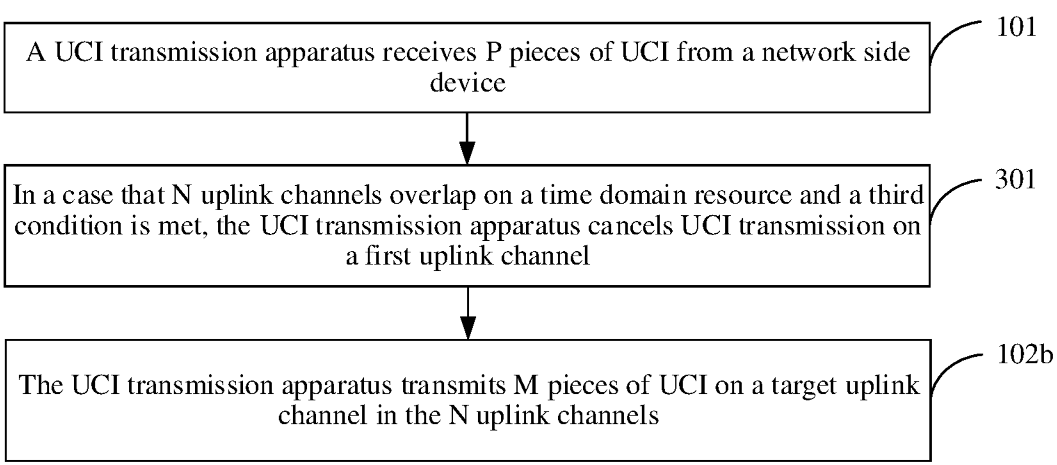
FIG. 4 is a third schematic diagram of a UCI transmission method according to an embodiment of this application.

The following clearly describes the technical solutions in embodiments of this application with reference to the accompanying drawings in embodiments of this application. Apparently, the described embodiments are some but not all of embodiments of this application. All other embodiments obtained by persons of ordinary skill in the art based on embodiments of this application shall fall within the protection scope of this application.

Terms included in embodiments of this application are described below.

1. UCI is Multiplexed on an Uplink Channel

Before UE transmits a plurality of pieces of UCI on a plurality of uplink channels, at least one of the plurality of pieces of UCI or uplink data to-be-carried on a specific uplink channel in the plurality of uplink channels may be jointly encoded, and UCI transmission on at least one uplink channel (for example, an uplink channel that carries the at least one piece of UCI) is canceled, to multiplex the at least one piece of UCI on the specific uplink channel. It can be understood that the at least one piece of UCI is increased on the specific uplink channel after the at least one piece of UCI is multiplexed on the specific uplink channel.

2. Priority of an Uplink Channel

When a network side device schedules a specific uplink channel, a DCI format (format) 0-1 and a format 0-2 may include a priority indicator field, and the priority indicator field indicates whether the scheduled uplink channel has a high priority or low priority.

3. Other Terms

The terms “first”, “second”, and the like in the specification and claims of this application are used to distinguish between similar objects, but not to indicate a specific order or sequence. It should be understood that the terms used in this way are interchangeable in appropriate circumstances, so that embodiments of this application can be implemented in ab order other than the order illustrated or described herein. In addition, the objects distinguished by “first” and “second” usually belong to one category, and the number of objects is not limited. For example, there may be one or more first objects. In addition, in the specification and claims, “and/or” represents at least one of connected objects, and the character “/” typically represents an “or” relationship between the associated objects.

It should be noted that the technologies described in embodiments of this application are not limited to a long term evolution (LTE)/LTE-advanced (LTE-A) system, and may be further used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms “system” and “network” in embodiments of this application are usually used interchangeably. The described technologies may be used in the aforementioned systems and radio technologies, and may also be used in other systems and radio technologies. In the following descriptions, a new radio (NR) system is described for an illustration purpose, and NR terms are used in most of the following descriptions. However, these technologies may also be applied to applications other than an NR system application, for example, a 6-th generation (6G) communications system.

FIG. 1 is a block diagram of a wireless communications system to which an embodiment of this application is applicable. The wireless communications system includes a terminal 11 and a network side device 12. The terminal 11 may also be referred to as a terminal device or user equipment (UE). The terminal 11 may be a terminal side device such as a mobile phone, a tablet personal computer, a laptop computer or referred to as a notebook computer, a personal digital assistant (PDA), a palmtop computer, a netbook, an ultra-mobile personal computer (UMPC), a mobile Internet device (MID), a wearable device, vehicle user equipment (VUE), or pedestrian user equipment (PUE). The wearable device includes a smartwatch, a band, a headset, glasses, or the like. It should be noted that a specific type of the terminal 11 is not limited in embodiments of this application. The network side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmitting receiving point (TRP), or another appropriate term in the art. Provided that the same technical effect is achieved, the base station is not limited to a specific technical term. In embodiments of this application, a base station in an NR system is merely used as an example, but a specific type of the base station is not limited.

The following describes in detail a UCI transmission method provided in embodiments of this application with reference to the accompanying drawings and by using some embodiments and application scenarios thereof.

FIG. 2 is a flowchart of a UCI transmission method according to an embodiment of this application. As shown in FIG. 2, the UCI transmission method provided in embodiments of this application may include the following step 101 and step 102.

Step 101: A UCI transmission apparatus receives P pieces of UCI from a network side device.

In embodiments of this application, P is a positive integer.

Optionally, in embodiments of this application, for each of the P pieces of UCI, one piece of UCI may be any of the following: a hybrid automatic repeat request acknowledgement (HARQ-ACK), a scheduling request (SR), channel state information (CSI), and physical random access channel (PRACH) information.

Optionally, in embodiments of this application, all of the P pieces of UCI may belong to a same UCI type; or some UCI belongs to a same UCI type; or all UCI belongs to different UCI types.

For example, assuming that the P pieces of UCI include a HARQ-ACK 1, a HARQ-ACK 2, and a HARQ-ACK 3, that is all UCI belongs to a same UCI type; or assuming that the P pieces of UCI include a HARQ-ACK 1, a HARQ-ACK 2, and an SR 1, that is some UCI belongs to a same UCI type.

Step 102: In a case that N uplink channels overlap on a time domain resource, the UCI transmission apparatus transmits M pieces of UCI to-be-carried on the N uplink channels on a target uplink channel in the N uplink channels.

It should be noted that, that “N uplink channels overlap on a time domain resource” may be understood as follows: All of the N uplink channels overlap; or some of the N uplink channels overlap (for example, every two uplink channels overlap).

In embodiments of this application, the N uplink channels include P uplink channels on which the P pieces of UCI is carried respectively, and one piece of UCI is carried on each uplink channel, where $P \leq N$. The M pieces of UCI include the P pieces of UCI, where $P \leq M$.

Optionally, in embodiments of this application, for each of the N uplink channels, one uplink channel may be any one of the following: a physical uplink control channel (PUCCH) and a physical uplink shared channel (PUSCH).

In embodiments of this application, the target uplink channel is determined based on at least one of the following: priorities of the N uplink channels, or channel types of the N uplink channels, where both N and M are positive integers.

Optionally, in embodiments of this application, the priorities of the N uplink channels may be configured by the network side device or determined by the UCI transmission apparatus.

Optionally, in embodiments of this application, in a case that second UCI of the P pieces of UCI includes a first indicator field, a priority of an uplink channel that carries the second UCI is determined by the first indicator field; or in a case that second UCI of the P pieces of UCI does not include a first indicator field, a priority of an uplink channel that carries the second UCI has a low priority. The second UCI is any one of the P pieces of UCI.

Optionally, in embodiments of this application, a priority of third UCI of the M pieces of UCI is configured by the network side device. The third UCI is UCI of the M pieces of UCI other than the P pieces of UCI.

Optionally, in embodiments of this application, the channel type may include at least one of the following: a PUCCH or a PUSCH.

Optionally, in embodiments of this application, in a case that the target uplink channel is determined based on the priorities of the N uplink channels, the UCI transmission apparatus may first determine the target uplink channel from the N uplink channels, and then the UCI transmission apparatus may directly transmit the target uplink channel to transmit the M pieces of UCI (for example, UCI to-be-carried on the target uplink channel).

Optionally, in embodiments of this application, in a case that the target uplink channel is determined based on the priorities of the N uplink channels and the channel types of the N uplink channels, the UCI transmission apparatus may multiplex UCI with a same type (and/or UCI with different types) in the M pieces of UCI on the target uplink channel, and transmit the target uplink channel to transmit the M pieces of UCI.

For example, assuming that the M pieces of UCI include the HARQ-ACK 1, the HARQ-ACK 2, the SR 1, and CSI 1, in a case that the target uplink channel is determined based on the priorities of the N uplink channels and the channel types of the N uplink channels, the UCI transmission apparatus may multiplex UCI with a same type in the M pieces of UCI, that is, the HARQ-ACK 1 and the HARQ-ACK 2, on the target uplink channel, and transmit the target uplink channel.

Optionally, in embodiments of this application, in a case that the UCI transmission apparatus transmits the M pieces of UCI to-be-carried on the N uplink channels on the target uplink channel, the UCI transmission apparatus may cancel transmission on a second uplink channel, or may continue to perform transmission on the second uplink channel. The second uplink channel is an uplink channel in the N uplink channels other than the target uplink channel.

In the UCI transmission method provided in embodiments of this application, in a case that N uplink channels overlap on a time domain resource, a UCI transmission apparatus may transmit M pieces of UCI to-be-carried on the N uplink channels on a target uplink channel in the N uplink channels that is determined based on priorities of the N uplink channels (and/or channel types of the N uplink channels). During transmission of a service of the UCI transmission apparatus, in a case that N uplink channels overlap on a time domain resource because another service needs to be transmitted, the UCI transmission apparatus may transmit M pieces of UCI on a target uplink channel in the N uplink channels that is determined based on priorities of the N uplink channels (and/or channel types of the N uplink channels), without canceling transmission of UCI of a specific service, so that UCI transmission reliability of the UCI transmission apparatus can be improved.

How the target uplink channel is determined based on the priorities of the N uplink channels is described below by using an example.

Optionally, in embodiments of this application, in a case that the target uplink channel is determined based on the priorities of the N uplink channels, the target uplink channel is a high-priority uplink channel in the N uplink channels. The M pieces of UCI are UCI to-be-carried on the high-priority uplink channel.

It can be understood that the UCI transmission apparatus may cancel UCI transmission on other uplink channels (for example, an uplink channel in the N uplink channels other than the target uplink channel), and transmit UCI on the high-priority uplink channel, that is, the UCI transmission apparatus transmits UCI in a priorization manner.

How the target uplink channel is determined based on the priorities of the N uplink channels and the channel types of the N uplink channels is described below by using an example.

Optionally, in embodiments of this application, the target uplink channel is determined based on the priorities of the N uplink channels and the channel types of the N uplink channels. In some embodiments, with reference to FIG. 2, as shown in FIG. 3, before "the UCI transmission apparatus transmits M pieces of UCI to-be-carried on the N uplink channels on a target uplink channel in the N uplink channels" in step 102, the UCI transmission method provided in embodiments of this application may further include the following step 201, and step 102 may be implemented by the following step 102*a*.

Step 201: In a case that the N uplink channels overlap on a time domain resource and the N uplink channels include a PUCCH, the UCI transmission apparatus multiplexes first UCI on the target uplink channel in a target multiplexing mode.

In embodiments of this application, the target multiplexing mode is configured by the network side device; and the target multiplexing mode includes at least one of the following: allowing multiplexing between PUCCHs with different priorities, or allowing multiplexing between PUCCHs and PUSCHs with different priorities.

It should be noted that the "allowing multiplexing between PUCCHs with different priorities" may be understood as follows: The UCI transmission apparatus may multiplex UCI to-be-carried on one of a plurality of PUCCHs with different priorities to another PUCCH. The "allowing multiplexing between PUCCHs and PUSCHs with different priorities" may be understood as follows: The UCI transmission apparatus may multiplex UCI to-be-carried on a PUCCH (or PUSCH) to a PUSCH (or PUCCH) among PUCCHs and PUSCHs with different priorities.

Optionally, in embodiments of this application, in a case that the target multiplexing mode is allowing multiplexing between PUCCHs with different priorities, the UCI transmission apparatus may first multiplex a part of UCI on a PUCCH (for example, a high-priority PUCCH), and then multiplex, on a PUSCH, the part of UCI and UCI to-be-carried on the PUCCH, to multiplex the first UCI on the target uplink channel (namely, the PUSCH). It can be understood that the first UCI includes the part of UCI and the UCI to-be-carried on the PUCCH.

In embodiments of this application, the first UCI includes UCI with a same type in the M pieces of UCI.

It can be understood that a type of the first UCI is the same as that of the UCI to-be-carried on the target uplink channel.

Optionally, in a possible implementation of this embodiment of this application, the target multiplexing mode is allowing multiplexing between PUCCHs with different priorities, the N uplink channels include X PUCCHs and Y PUSCHs, and the first UCI includes UCI with a same type that is carried on the X PUCCHs.

In a case that X is a positive integer, Y is 0, and the X PUCCHs include a low-priority PUCCH and a high-priority PUCCH, the target uplink channel is the high-priority PUCCH;

in a case that X is a positive integer, Y is a positive integer, the X PUCCHs include a low-priority PUCCH and a high-priority PUCCH, and the Y PUSCHs do not include a high-priority PUSCH (in other words, the Y PUSCHs include only a low-priority PUSCH), the target uplink channel is the high-priority PUCCH;

in a case that X is a positive integer, Y is a positive integer, the X PUCCHs include a low-priority PUCCH and a high-priority PUCCH, and the Y PUSCHs include a high-priority PUSCH, the target uplink channel is the high-priority PUSCH; and in a case that X is a positive integer, Y is a positive integer, the X PUCCHs do not include a high-priority PUCCH (in other words, the X PUCCHs include only a low-priority PUCCH), and the Y PUSCHs do not include a high-priority PUSCH (in other words, the Y PUSCHs include only a low-priority PUSCH), the target uplink channel is the low-priority PUSCH.

How the UCI transmission apparatus multiplexes the first UCI on the target uplink channel in a case that the target multiplexing mode is allowing multiplexing between PUCCHs with different priorities is described in two different scenarios.

Single-Component Carrier (CC) Scenario:

As shown in Table 1, in the single-CC scenario, the UCI transmission apparatus multiplexes different UCI on different uplink channels based on priorities of different uplink channels and channel types of different uplink channels.

TABLE 1

| Example | Cell index | N uplink channels overlap | Actually transmitted channel and UCI in a case that multiplexing between PUCCHs with different priorities is allowed | Scheme description |
| --- | --- | --- | --- | --- |
| Case 1 | C1 | LP PUCCH<br>HP PUCCH | HP PUCCH (+LP UCI) | LP UCI to-be-carried on an LP PUCCH is multiplexed on an HP PUCCH, and the UCI transmission apparatus transmits the HP PUCCH that carries HP UCI and the LP UCI. |
| Case 2 | C1 | LP PUCCH<br>HP PUCCH<br>LP PUSCH | HP PUCCH (+LP UCI) | LP UCI to-be-carried on an LP PUCCH is multiplexed on an HP PUCCH, an LP PUSCH is canceled, and the UCI transmission apparatus transmits the HP PUCCH that carries HP UCI and the LP UCI. |
| Case 3 | C1 | LP PUCCH<br>HP PUCCH<br>HP PUSCH | HP PUSCH (+HP UCI + LP UCI) | First, multiplexing between PUCCHs with different priorities is performed, and LP UCI to-be-carried on an LP PUCCH is multiplexed on an HP PUCCH. Then multiplexing between the HP PUCCH and a PUSCH is performed, and HP UCI on the HP PUCCH is multiplexed on an HP PUSCH. The UCI transmission apparatus transmits the HP PUSCH that carries the HP UCI and the LP UCI. |
| Case 4 | C1 | LP PUCCH<br>HP PUCCH<br>LP PUSCH<br>HP PUSCH | HP PUSCH (+HP UCI + LP UCI) | First, multiplexing between PUCCHs with different priorities is performed, and LP UCI to-be-carried on an LP PUCCH is multiplexed on an HP PUCCH. Then multiplexing between the HP PUCCH and a PUSCH is performed, HP UCI on the HP PUCCH is multiplexed on an HP PUSCH, and an LP PUSCH is canceled. The UCI transmission apparatus |

TABLE 1-continued

| Example | Cell index | N uplink channels overlap | Actually transmitted channel and UCI in a case that multiplexing between PUCCHs with different priorities is allowed | Scheme description |
|---|---|---|---|---|
| | | | | transmits the HP PUSCH that carries the HP UCI and the LP UCI. |

As shown in Table 1, in the case 1, the N uplink channels include X PUCCHs and Y PUSCHs, where X is a positive integer (namely, 2), Y is 0, and the two PUCCHs include a low-priority PUCCH (namely, the LP PUCCH) and a high-priority PUCCH (namely, the HP PUCCH). Therefore, in a case that the two PUCCHs overlap on a time domain resource, the UCI transmission apparatus may multiplex the first UCI (for example, UCI to-be-carried on the low-priority PUCCH) on the target uplink channel (namely, the high-priority PUCCH), and transmit the multiplexed-to high-priority PUCCH.

In the case 2, the N uplink channels include X PUCCHs and Y PUSCHs, where X is a positive integer (for example, 2), Y is a positive integer (for example, 1), the two PUCCHs include a low-priority PUCCH and a high-priority PUCCH, and the PUSCH includes only a low-priority PUSCH (namely, the LP PUSCH). Therefore, in a case that the two PUCCHs and the PUSCH overlap on a time domain resource, the UCI transmission apparatus may multiplex the first UCI (for example, UCI to-be-carried on the low-priority PUCCH) on the target uplink channel (namely, the high-priority PUCCH), cancel transmission of the low-priority PUSCH, and transmit the multiplexed-to high-priority PUCCH.

In the case 3, the N uplink channels include X PUCCHs and Y PUSCHs, where X is a positive integer (for example, 2), Y is a positive integer (for example, 1), the two PUCCHs include a low-priority PUCCH and a high-priority PUCCH, and the PUSCH includes a high-priority PUSCH (namely, the HP PUSCH). Therefore, in a case that the two PUCCHs and the PUSCH overlap on a time domain resource, the UCI transmission apparatus may multiplex the first UCI (for example, UCI to-be-carried on the low-priority PUCCH, and UCI to-be-carried on the high-priority PUCCH) on the target uplink channel (namely, the high-priority PUSCH), and transmit the multiplexed-to high-priority PUSCH.

In the case 4, the N uplink channels include X PUCCHs and Y PUSCHs, where X is a positive integer (for example, 2), Y is a positive integer (for example, 2), the two PUCCHs include a low-priority PUCCH and a high-priority PUCCH, and the two PUSCHs include a low-priority PUSCH and a high-priority PUSCH. Therefore, in a case that the two PUCCHs and the two PUSCHs overlap on a time domain resource, the UCI transmission apparatus may multiplex the first UCI (for example, UCI to-be-carried on the low-priority PUCCH, and UCI to-be-carried on the high-priority PUCCH) on the target uplink channel (namely, the high-priority PUSCH), cancel transmission of the low-priority PUSCH, and transmit the multiplexed-to high-priority PUSCH.

Multi-CC Scenario:

As shown in Table 2, in the multi-CC (for example, dual-CC) scenario, the UCI transmission apparatus multiplexes different UCI on different uplink channels based on priorities of different uplink channels and channel types of different uplink channels.

TABLE 2

| Example | Cell index | N uplink channels overlap | Actually transmitted channel and UCI in a case that multiplexing between PUCCHs with different priorities is allowed | Scheme description |
|---|---|---|---|---|
| Case 1 | C1 | LP PUCCH | | LP UCI to-be-carried on an LP PUCCH is multiplexed on an LP PUSCH, and the UCI transmission apparatus transmits the LP PUSCH that carries the LP UCI. |
| | C2 | LP PUSCH | LP PUSCH (+LP UCI) | |
| Case 2 | C1 | LP PUCCH<br>HP PUCCH | HP PUCCH (+LP UCI) | First, multiplexing between PUCCHs with different priorities is performed, and LP UCI to-be-carried on an LP PUCCH is multiplexed on an HP PUCCH. The LP PUSCH is cancelled. The UCI transmission apparatus transmits the HP PUCCH that carries HP UCI and the LP UCI. |
| | C2 | LP PUSCH | | |
| Case 3 | C1 | LP PUCCH<br>HP PUCCH | | First, multiplexing between PUCCHs with different priorities is performed, and |

TABLE 2-continued

| Example | Cell index | N uplink channels overlap | Actually transmitted channel and UCI in a case that multiplexing between PUCCHs with different priorities is allowed | Scheme description |
|---|---|---|---|---|
| | | | | LP UCI to-be-carried on an LP PUCCH is multiplexed on an HP PUCCH. Then multiplexing is performed from the HP PUCCH to an HP PUSCH. The UCI transmission apparatus transmits the HP PUSCH that carries HP UCI and the LP UCI. |
| | C2 | HP PUSCH | HP PUSCH (+HP UCI + LP UCI) | |
| Case 4 | C1 | LP PUCCH HP PUCCH | | First, multiplexing between PUCCHs with different priorities is performed, and LP UCI to-be-carried on an LP PUCCH is multiplexed on an HP PUCCH. Multiplexing is performed from the HP PUCCH to an HP PUSCH. The UCI transmission apparatus transmits the HP PUSCH that carries HP UCI and the LP UCI, and an LP PUSCH. |
| | C2 | LP PUSCH | LP PUSCH | |
| | C3 | HP PUSCH | HP PUSCH (+HP UCI + LP UCI) | |

As shown in Table 2, in the case 1, the N uplink channels include X PUCCHs and Y PUSCHs, where X is a positive integer (namely, 1), Y is a positive integer (namely, 1), the PUCCH includes a low-priority PUCCH, the PUSCH includes a low-priority PUSCH, the PUCCH corresponds to a cell 1 (namely, C1), and the PUSCH corresponds to a cell 2 (namely, C2). Therefore, in a case that the PUCCH and the PUSCH overlap on a time domain resource, the UCI transmission apparatus may multiplex the first UCI (for example, UCI to-be-carried on the low-priority PUCCH) on the target uplink channel (namely, the low-priority PUSCH), and transmit the multiplexed-to low-priority PUSCH.

In the case 2, the N uplink channels include X PUCCHs and Y PUSCHs, where X is a positive integer (for example, 2), Y is a positive integer (for example, 1), the two PUCCHs include a low-priority PUCCH and a high-priority PUCCH, the PUSCH includes a low-priority PUSCH, the two PUCCHs correspond to a C1, and the PUSCH corresponds to a C2. Therefore, in a case that the two PUCCHs and the PUSCH overlap on a time domain resource, the UCI transmission apparatus may multiplex the first UCI (for example, UCI to-be-carried on the low-priority PUCCH) on the target uplink channel (namely, the high-priority PUCCH), cancel transmission of the low-priority PUSCH, and transmit the multiplexed-to high-priority PUCCH.

In the case 3, the N uplink channels include X PUCCHs and Y PUSCHs, where X is a positive integer (for example, 2), Y is a positive integer (for example, 1), the two PUCCHs include a low-priority PUCCH and a high-priority PUCCH, the PUSCH includes a high-priority PUSCH, the two PUCCHs correspond to a C1, and the PUSCH corresponds to a C2. Therefore, in a case that the two PUCCHs and the PUSCH overlap on a time domain resource, the UCI transmission apparatus may multiplex the first UCI (for example, UCI to-be-carried on the low-priority PUCCH, and UCI to-be-carried on the high-priority PUCCH) on the target uplink channel (namely, the high-priority PUSCH), and transmit the multiplexed-to high-priority PUSCH.

In the case 4, the N uplink channels include X PUCCHs and Y PUSCHs, where X is a positive integer (for example, 2), Y is a positive integer (for example, 2), the two PUCCHs include a low-priority PUCCH and a high-priority PUCCH, the two PUSCHs include a low-priority PUSCH and a high-priority PUSCH, the two PUCCHs correspond to a C1, the low-priority PUSCH of the two PUSCHs corresponds to a C2, and the high-priority PUSCH of the two PUSCHs corresponds to a C3. Therefore, in a case that the two PUCCHs and the two PUSCHs overlap on a time domain resource, the UCI transmission apparatus may multiplex the first UCI (for example, UCI to-be-carried on the low-priority PUCCH, and UCI to-be-carried on the high-priority PUCCH) on the target uplink channel (namely, the high-priority PUSCH), transmit the low-priority PUSCH, and transmit the multiplexed-to high-priority PUSCH.

Optionally, in another possible implementation of this embodiment of this application, the target multiplexing mode is allowing multiplexing between PUCCHs and PUSCHs with different priorities, the N uplink channels include X PUCCHs and Y PUSCHs, and the first UCI includes UCI with a same type that is carried on the X PUCCHs.

In a case that Y is a positive integer, the target uplink channel is a high-priority PUSCH or a low-priority PUSCH of the Y PUSCHs.

How the UCI transmission apparatus multiplexes the first UCI to the target uplink channel in a case that the target multiplexing mode is allowing multiplexing between PUCCHs and PUSCHs with different priorities is described in two different scenarios.

Single-CC Scenario:

As shown in Table 3, in the single-CC scenario, the UCI transmission apparatus multiplexes different UCI on different uplink channels based on priorities of different uplink channels and channel types of different uplink channels.

TABLE 3

| Example | Cell index | N uplink channels overlap | Actually transmitted channel and UCI in a case that multiplexing between PUCCHs and PUSCHs with different priorities is allowed | Scheme description |
|---|---|---|---|---|
| Case 1 | C1 | LP PUCCH HP PUCCH LP PUSCH | LP PUSCH (+HP + LP UCI) | HP UCI to-be-carried on an HP PUCCH and LP UCI to-be-carried on an LP PUCCH are multiplexed on an LP PUSCH, and the UCI transmission apparatus transmits the LP PUSCH that carries the HP UCI and the LP UCI. |
| Case 2 | C1 | LP PUCCH HP PUCCH HP PUSCH | HP PUSCH (+HP UCI + LP UCI) | HP UCI to-be-carried on an HP PUCCH is multiplexed on an HP PUSCH resource, LP UCI to-be-carried on an LP PUCCH is also multiplexed on the HP PUSCH, and the UCI transmission apparatus transmits the HP PUSCH that carries the HP UCI and the LP UCI. |
| Case 3 | C1 | LP PUCCH HP PUCCH LP PUSCH HP PUSCH | HP PUSCH (+HP UCI + LP UCI) | HP UCI to-be-carried on an HP PUCCH is multiplexed on an HP PUSCH resource, LP UCI to-be-carried on an LP PUCCH is also multiplexed on the HP PUSCH, an LP PUSCH is canceled, and the UCI transmission apparatus transmits the HP PUSCH that carries the HP UCI and the LP UCI. |

As shown in Table 3, in the case 1, the N uplink channels include X PUCCHs and Y PUSCHs, where X is a positive integer (namely, 2), Y is a positive integer (namely, 1), the two PUCCHs include a low-priority PUCCH and a high-priority PUCCH, and the PUSCH includes a low-priority PUSCH. Therefore, in a case that the two PUCCHs and the PUSCH overlap on a time domain resource, the UCI transmission apparatus may multiplex the first UCI (for example, UCI to-be-carried on the low-priority PUCCH, and UCI to-be-carried on the high-priority PUCCH) on the target uplink channel (namely, the low-priority PUSCH), and transmit the multiplexed-to low-priority PUSCH.

In the case 2, the N uplink channels include X PUCCHs and Y PUSCHs, where X is a positive integer (for example, 2), Y is a positive integer (for example, 1), the two PUCCHs include a low-priority PUCCH and a high-priority PUCCH, and the PUSCH includes a high-priority PUSCH. Therefore, in a case that the two PUCCHs and the PUSCH overlap on a time domain resource, the UCI transmission apparatus may multiplex the first UCI (for example, UCI to-be-carried on the low-priority PUCCH, and UCI to-be-carried on the high-priority PUCCH) on the target uplink channel (namely, the high-priority PUSCH), and transmit the multiplexed-to high-priority PUSCH.

In the case 3, the N uplink channels include X PUCCHs and Y PUSCHs, where X is a positive integer (for example, 2), Y is a positive integer (for example, 2), the two PUCCHs include a low-priority PUCCH and a high-priority PUCCH, and the two PUSCHs include a low-priority PUSCH and a high-priority PUSCH. Therefore, in a case that the two PUCCHs and the two PUSCHs overlap on a time domain resource, the UCI transmission apparatus may multiplex the first UCI (for example, UCI to-be-carried on the low-priority PUCCH, and UCI to-be-carried on the high-priority PUCCH) on the target uplink channel (namely, the high-priority PUSCH), cancel transmission of the low-priority PUSCH, and transmit the multiplexed-to high-priority PUSCH.

Multi-CC Scenario:

As shown in Table 4, in the multi-CC (for example, dual-CC) scenario, the UCI transmission apparatus multiplexes different UCI on different uplink channels based on priorities of different uplink channels and channel types of different uplink channels.

TABLE 4

| Example | Cell index | N uplink channels overlap | Actually transmitted channel and UCI in a case that multiplexing between PUCCHs and PUSCHs with different priorities is allowed | Scheme description |
|---|---|---|---|---|
| Case 1 | C1 | LP PUCCH | | LP UCI to-be-carried on an LP PUCCH is multiplexed on an LP PUSCH, and the UCI transmission apparatus transmits the LP PUSCH that carries the LP UCI. |
| | C2 | LP PUSCH | LP PUSCH (+LP UCI) | |
| Case 2 | C1 | LP PUCCH | | LP UCI to-be-carried on an LP PUCCH is multiplexed on an HP PUSCH, and the UCI transmission apparatus transmits the HP PUSCH that carries the LP UCI. |
| | C2 | HP PUSCH | HP PUSCH (+LP UCI) | |
| Case 3 | C1 | LP PUCCH HP PUCCH | | LP UCI to-be-carried on an LP PUCCH is multiplexed on an LP PUSCH, HP UCI to-be-carried on an HP PUCCH is multiplexed on the LP PUSCH, and the UCI transmission apparatus transmits the LP PUSCH that carries the HP UCI and the LP UCI. |
| | C2 | LP PUSCH | LP PUSCH (+HP UCI + LP UCI) | |
| Case 4 | C1 | LP PUCCH HP PUCCH | | HP UCI to-be-carried on an HP PUCCH is multiplexed on an HP PUSCH, LP UCI to-be-carried on an LP PUCCH is multiplexed on the HP PUSCH, and the UCI transmission apparatus transmits the HP PUSCH that carries the HP UCI and the LP UCI. |
| | C2 | HP PUSCH | HP PUSCH (+HP UCI + LP UCI) | |
| Case 5 | C1 | LP PUCCH HP PUCCH | | HP UCI to-be-carried on an HP PUCCH is multiplexed on an HP PUSCH, LP UCI to-be-carried on an LP PUCCH is multiplexed on the HP PUSCH, and the UCI transmission apparatus transmits the HP PUSCH that carries the HP UCI and the LP UCI, and an LP PUSCH. |
| | C2 | LP PUSCH | LP PUSCH | |
| | C3 | HP PUSCH | HP PUSCH (+HP UCI + LP UCI) | |

As shown in Table 4, in the case 1, the N uplink channels include X PUCCHs and Y PUSCHs, where X is a positive integer (namely, 1), Y is a positive integer (namely, 1), the PUCCH includes a low-priority PUCCH, the PUSCH includes a low-priority PUSCH, the PUCCH corresponds to a cell 1 (namely, C1), and the PUSCH corresponds to a cell 2 (namely, C2). Therefore, in a case that the PUCCH and the PUSCH overlap on a time domain resource, the UCI transmission apparatus may multiplex the first UCI (for example, UCI to-be-carried on the low-priority PUCCH) on the target uplink channel (namely, the low-priority PUSCH), and transmit the multiplexed-to low-priority PUSCH.

In the case 2, the N uplink channels include X PUCCHs and Y PUSCHs, where X is a positive integer (for example, 1), Y is a positive integer (for example, 1), the PUCCH includes a low-priority PUCCH, the PUSCH includes a high-priority PUSCH, the PUCCH corresponds to a cell 1 (namely, C1), and the PUSCH corresponds to a cell 2 (namely, C2). Therefore, in a case that the PUCCH and the PUSCH overlap on a time domain resource, the UCI transmission apparatus may multiplex the first UCI (for example, UCI to-be-carried on the low-priority PUCCH) on the target uplink channel (namely, the high-priority PUSCH), and transmit the multiplexed-to high-priority PUSCH.

In the case 3, the N uplink channels include X PUCCHs and Y PUSCHs, where X is a positive integer (for example, 2), Y is a positive integer (for example, 1), the two PUCCHs include a low-priority PUCCH and a high-priority PUCCH, the PUSCH includes a low-priority PUSCH, the two PUCCHs correspond to a C1, and the PUSCH corresponds to a C2. Therefore, in a case that the two PUCCHs and the PUSCH overlap on a time domain resource, the UCI transmission apparatus may multiplex the first UCI (for example, UCI to-be-carried on the low-priority PUCCH, and UCI to-be-carried on the high-priority PUCCH) on the target uplink channel (namely, the low-priority PUSCH), and transmit the multiplexed-to low-priority PUSCH.

In the case 4, the N uplink channels include X PUCCHs and Y PUSCHs, where X is a positive integer (for example, 2), Y is a positive integer (for example, 1), the two PUCCHs include a low-priority PUCCH and a high-priority PUCCH, the PUSCH includes a high-priority PUSCH, the two PUCCHs correspond to a C1, and the PUSCH corresponds to a C2. Therefore, in a case that the two PUCCHs and the PUSCH overlap on a time domain resource, the UCI transmission apparatus may multiplex the first UCI (for example, UCI to-be-carried on the low-priority PUCCH, and UCI to-be-carried on the high-priority PUCCH) on the target uplink channel (namely, the high-priority PUSCH), and transmit the multiplexed-to high-priority PUSCH.

In the case 5, the N uplink channels include X PUCCHs and Y PUSCHs, where X is a positive integer (for example, 2), Y is a positive integer (for example, 2), the two PUCCHs include a low-priority PUCCH and a high-priority PUCCH, the two PUSCHs include a low-priority PUSCH and a high-priority PUSCH, the two PUCCHs correspond to a C1, the low-priority PUSCH of the two PUSCHs corresponds to a C2, and the high-priority PUSCH of the two PUSCHs corresponds to a C3. Therefore, in a case that the two PUCCHs and the two PUSCHs overlap on a time domain resource, the UCI transmission apparatus may multiplex the first UCI (for example, UCI to-be-carried on the low-priority PUCCH, and UCI to-be-carried on the high-priority PUCCH) on the target uplink channel (namely, the high-priority PUSCH), transmit the low-priority PUSCH, and transmit the multiplexed-to high-priority PUSCH.

It can be understood that, in a case that both a high-priority PUSCH and a low-priority PUSCH exist, the UCI transmission apparatus may preferentially multiplex the first UCI on the high-priority PUSCH.

Optionally, in still another possible implementation of this embodiment of this application, the target multiplexing mode includes: allowing multiplexing between PUCCHs with different priorities, and allowing multiplexing between PUCCHs and PUSCHs with different priorities; the N uplink channels include X PUCCHs and Y PUSCHs; and the first UCI includes UCI with a same type that is carried on the X PUCCHs.

In a case that X is a positive integer and Y is 0, the target uplink channel is a high-priority PUCCH of the X PUCCHs;

in a case that X is a positive integer, Y is a positive integer, the X PUCCHs include a low-priority PUCCH and a high-priority PUCCH, and the Y PUSCHs include a high-priority PUSCH, the target uplink channel is the high-priority PUSCH; and in a case that X is a positive integer, Y is a positive integer, the X PUCCHs include a low-priority PUCCH and a high-priority PUCCH, and the Y PUSCHs include only a low-priority PUSCH, the target uplink channel is the low-priority PUSCH.

How the UCI transmission apparatus multiplexes the first UCI on the target uplink channel in a case that the target multiplexing mode is allowing multiplexing between PUCCHs with different priorities and allowing multiplexing between PUCCHs and PUSCHs with different priorities is described in two different scenarios.

Single-CC Scenario:

As shown in Table 5, in the single-CC scenario, the UCI transmission apparatus multiplexes different UCI on different uplink channels based on priorities of different uplink channels and channel types of different uplink channels.

TABLE 5

| Example | Cell index | N uplink channels overlap | Actually transmitted channel and UCI in a case that multiplexing between PUCCHs with different priorities is allowed and multiplexing between PUCCHs and PUSCHs with different priorities is allowed | Scheme description |
|---|---|---|---|---|
| Case 1 | C1 | LP PUCCH<br>HP PUCCH | HP PUCCH (+LP UCI) | LP UCI to-be-carried on an LP PUCCH is multiplexed on an HP PUCCH, and the UCI transmission apparatus transmits the HP PUCCH that carries HP UCI and the LP UCI. |
| Case 2 | C1 | LP PUCCH<br>HP PUCCH<br>LP PUSCH | LP PUSCH (+HP UCI + LP UCI) | LP UCI to-be-carried on an HP PUCCH and LP UCI to-be-carried on an LP PUCCH are multiplexed on an LP PUSCH, and the UCI transmission apparatus transmits the LP PUSCH that carries HP UCI and the LP UCI. |

TABLE 5-continued

| Example | Cell index | N uplink channels overlap | Actually transmitted channel and UCI in a case that multiplexing between PUCCHs with different priorities is allowed and multiplexing between PUCCHs and PUSCHs with different priorities is allowed | Scheme description |
|---|---|---|---|---|
| Case 3 | C1 | LP PUCCH<br>HP PUCCH<br>HP PUSCH | HP PUSCH (+HP UCI + LP UCI) | HP UCI to-be-carried on an HP PUCCH is multiplexed on an HP PUSCH resource, LP UCI to-be-carried on an LP PUCCH is also multiplexed on the HP PUSCH, and the UCI transmission apparatus transmits the HP PUSCH that carries the HP UCI and the LP UCI. |
| Case 4 | C1 | LP PUCCH<br>HP PUCCH<br>LP PUSCH<br>HP PUSCH | HP PUSCH (+HP UCI + LP UCI) | HP UCI to-be-carried on an HP PUCCH is multiplexed on an HP PUSCH resource, LP UCI to-be-carried on an LP PUCCH is also multiplexed on the HP PUSCH, an LP PUSCH is canceled, and the UCI transmission apparatus transmits the HP PUSCH that carries the HP UCI and the LP UCI. |

As shown in Table 5, in the case 1, the N uplink channels include X PUCCHs and Y PUSCHs, where X is a positive integer (namely, 2), Y is 0, and the two PUCCHs include a low-priority PUCCH and a high-priority PUCCH. Therefore, in a case that the two PUCCHs overlap on a time domain resource, the UCI transmission apparatus may multiplex the first UCI (for example, UCI to-be-carried on the low-priority PUCCH) on the target uplink channel (namely, the high-priority PUCCH), and transmit the multiplexed-to high-priority PUCCH.

In the case 2, the N uplink channels include X PUCCHs and Y PUSCHs, where X is a positive integer (for example, 2), Y is a positive integer (for example, 1), the two PUCCHs include a low-priority PUCCH and a high-priority PUCCH, and the PUSCH includes a low-priority PUSCH. Therefore, in a case that the two PUCCHs and the PUSCH overlap on a time domain resource, the UCI transmission apparatus may multiplex the first UCI (for example, UCI to-be-carried on the low-priority PUCCH, and UCI to-be-carried on the high-priority PUCCH) on the target uplink channel (namely, the low-priority PUSCH), and transmit the multiplexed-to low-priority PUSCH.

In the case 3, the N uplink channels include X PUCCHs and Y PUSCHs, where X is a positive integer (for example, 2), Y is a positive integer (for example, 1), the two PUCCHs include a low-priority PUCCH and a high-priority PUCCH, and the PUSCH includes a high-priority PUSCH. Therefore, in a case that the two PUCCHs and the PUSCH overlap on a time domain resource, the UCI transmission apparatus may multiplex the first UCI (for example, UCI to-be-carried on the low-priority PUCCH, and UCI to-be-carried on the high-priority PUCCH) on the target uplink channel (namely, the high-priority PUSCH), and transmit the multiplexed-to high-priority PUSCH.

In the case 4, the N uplink channels include X PUCCHs and Y PUSCHs, where X is a positive integer (for example, 2), Y is a positive integer (for example, 2), the two PUCCHs include a low-priority PUCCH and a high-priority PUCCH, and the two PUSCHs include a low-priority PUSCH and a high-priority PUSCH. Therefore, in a case that the two PUCCHs and the two PUSCHs overlap on a time domain resource, the UCI transmission apparatus may multiplex the first UCI (for example, UCI to-be-carried on the low-priority PUCCH, and UCI to-be-carried on the high-priority PUCCH) on the target uplink channel (namely, the high-priority PUSCH), cancel transmission of the low-priority PUSCH, and transmit the multiplexed-to high-priority PUSCH.

It can be understood that, in a case that both a high-priority PUSCH and a low-priority PUSCH exist, the UCI transmission apparatus may preferentially multiplex the first UCI on the high-priority PUSCH.

Multi-CC Scenario:

As shown in Table 6, in the multi-CC (for example, dual-CC) scenario, the UCI transmission apparatus multiplexes different UCI on different uplink channels based on priorities of different uplink channels and channel types of different uplink channels.

TABLE 6

| Example | Cell index | N uplink channels overlap | Actually transmitted channel and UCI in a case that multiplexing between PUCCHs with different priorities is allowed and multiplexing between PUCCHs and PUSCHs with different priorities is allowed | Scheme description |
|---|---|---|---|---|
| Case 1 | C1 | LP PUCCH | | LP UCI to-be-carried on an LP PUCCH is multiplexed on an LP PUSCH, and the UCI transmission apparatus transmits the LP PUSCH that carries the LP UCI. |
| | C2 | LP PUSCH | LP PUSCH (+LP UCI) | |
| Case 2 | C1 | LP PUCCH | | LP UCI to-be-carried on an LP PUCCH is multiplexed on an HP PUSCH, and the UCI transmission apparatus transmits the HP PUSCH that carries the LP UCI. |
| | C2 | HP PUSCH | HP PUSCH (+LP UCI) | |
| Case 3 | C1 | LP PUCCH<br>HP PUCCH | | LP UCI to-be-carried on an LP PUCCH is multiplexed on an LP PUSCH, HP UCI to-be-carried on an HP PUCCH is multiplexed on the LP PUSCH, and the UCI transmission apparatus transmits the LP PUSCH that carries the HP UCI and the LP UCI. |
| | C2 | LP PUSCH | LP PUSCH (+HP + LP UCI) | |
| Case 4 | C1 | LP PUCCH<br>HP PUCCH | | HP UCI to-be-carried on an HP PUCCH is multiplexed on an HP PUSCH, LP UCI to-be-carried on an LP PUCCH is multiplexed on the HP PUSCH, and the UCI transmission apparatus transmits the HP PUSCH that carries the HP UCI and the LP UCI. |
| | C2 | HP PUSCH | HP PUSCH (+HP UCI + LP UCI) | |
| Case 5 | C1 | LP PUCCH<br>HP PUCCH | | HP UCI to-be-carried on an HP PUCCH is multiplexed on an HP PUSCH, LP UCI to-be-carried on an LP PUCCH is multiplexed on the HP PUSCH, and the UCI transmission apparatus transmits the HP PUSCH that carries the HP UCI and the LP UCI, and an LP PUSCH. |
| | C2 | LP PUSCH | LP PUSCH | |
| | C3 | HP PUSCH | HP PUSCH (+HP UCI + LP UCI) | |

As shown in Table 6, in the case 1, the N uplink channels include X PUCCHs and Y PUSCHs, where X is a positive integer (namely, 1), Y is a positive integer (namely, 1), the PUCCH includes a low-priority PUCCH, the PUSCH includes a low-priority PUSCH, the PUCCH corresponds to a cell 1 (namely, C1), and the PUSCH corresponds to a cell 2 (namely, C2). Therefore, in a case that the PUCCH and the PUSCH overlap on a time domain resource, the UCI transmission apparatus may multiplex the first UCI (for example, UCI to-be-carried on the low-priority PUCCH) on the target uplink channel (namely, the low-priority PUSCH), and transmit the multiplexed-to low-priority PUSCH.

In the case 2, the N uplink channels include X PUCCHs and Y PUSCHs, where X is a positive integer (for example, 1), Y is a positive integer (for example, 1), the PUCCH includes a low-priority PUCCH, the PUSCH includes a high-priority PUSCH, the PUCCH corresponds to a cell 1 (namely, C1), and the PUSCH corresponds to a cell 2 (namely, C2). Therefore, in a case that the PUCCH and the PUSCH overlap on a time domain resource, the UCI transmission apparatus may multiplex the first UCI (for example, UCI to-be-carried on the low-priority PUCCH) on the target uplink channel (namely, the high-priority PUSCH), and transmit the multiplexed-to high-priority PUSCH.

In the case 3, the N uplink channels include X PUCCHs and Y PUSCHs, where X is a positive integer (for example, 2), Y is a positive integer (for example, 1), the two PUCCHs include a low-priority PUCCH and a high-priority PUCCH, the PUSCH includes a low-priority PUSCH, the two PUCCHs correspond to a C1, and the PUSCH corresponds to a C2. Therefore, in a case that the two PUCCHs and the PUSCH overlap on a time domain resource, the UCI transmission apparatus may multiplex the first UCI (for example, UCI to-be-carried on the low-priority PUCCH, and UCI to-be-carried on the high-priority PUCCH) on the target uplink channel (namely, the low-priority PUSCH), and transmit the multiplexed-to low-priority PUSCH.

In the case 4, the N uplink channels include X PUCCHs and Y PUSCHs, where X is a positive integer (for example, 2), Y is a positive integer (for example, 1), the two PUCCHs include a low-priority PUCCH and a high-priority PUCCH, the PUSCH includes a high-priority PUSCH, the two PUCCHs correspond to a C1, and the PUSCH corresponds to a C2. Therefore, in a case that the two PUCCHs and the PUSCH overlap on a time domain resource, the UCI transmission apparatus may multiplex the first UCI (for example, UCI to-be-carried on the low-priority PUCCH, and UCI to-be-carried on the high-priority PUCCH) on the target uplink channel (namely, the high-priority PUSCH), and transmit the multiplexed-to high-priority PUSCH.

In the case 5, the N uplink channels include X PUCCHs and Y PUSCHs, where X is a positive integer (for example, 2), Y is a positive integer (for example, 2), the two PUCCHs include a low-priority PUCCH and a high-priority PUCCH, the two PUSCHs include a low-priority PUSCH and a high-priority PUSCH, the two PUCCHs correspond to a C1, the low-priority PUSCH of the two PUSCHs corresponds to a C2, and the high-priority PUSCH of the two PUSCHs corresponds to a C3. Therefore, in a case that the two PUCCHs and the two PUSCHs overlap on a time domain resource, the UCI transmission apparatus may multiplex the first UCI (for example, UCI to-be-carried on the low-priority PUCCH, and UCI to-be-carried on the high-priority PUCCH) on the target uplink channel (namely, the high-priority PUSCH), transmit the low-priority PUSCH, and transmit the multiplexed-to high-priority PUSCH.

It can be understood that, in a case that both a high-priority PUSCH and a low-priority PUSCH exist, the UCI transmission apparatus may preferentially multiplex the first UCI on the high-priority PUSCH.

Step 102*a*: The UCI transmission apparatus transmits the M pieces of UCI on the target uplink channel in the N uplink channels.

It can be understood that the M pieces of UCI include the first UCI and/or the UCI to-be-carried on the target uplink channel.

It can be learned that, in a case that the N uplink channels include a PUCCH, the UCI transmission apparatus may multiplex UCI with a same type in the M pieces of UCI on the target uplink channel in a mode in which multiplexing between PUCCHs with different priorities is allowed (and/or multiplexing between PUCCHs and PUSCHs with different priorities is allowed), without canceling transmission of UCI of a specific service. This can reduce impact on a low-priority service while ensuring transmission of a high-priority service. In this way, service reliability of the UCI transmission apparatus can be improved.

Optionally, in embodiments of this application, the first UCI includes a first HARQ-ACK to-be-carried on a high-priority uplink channel, a second HARQ-ACK to-be-carried on a low-priority uplink channel, and a first part of channel state information CSI-part 1 to-be-carried on the low-priority uplink channel, and the target uplink channel is a low-priority PUSCH. In some embodiments, step 201 may be implemented by the following step 201*a*.

Step 201*a*: In a case that the N uplink channels overlap on a time domain resource, the N uplink channels include a PUCCH, and a first condition is met, in the target multiplexing mode, the UCI transmission apparatus maps the first HARQ-ACK according to a default mapping rule, and maps the second HARQ-ACK according to the first rule based on the CSI-part 1.

Optionally, in embodiments of this application, the first condition may be as follows: The first HARQ-ACK includes more than 2 bits, and the second HARQ-ACK includes more than 2 bits.

Optionally, in embodiments of this application, the first UCI further includes a second part of channel state information CSI-part 2 to-be-carried on the low-priority uplink channel; and the first rule includes any one of the following:

- discarding the CSI-part 2, and mapping the second HARQ-ACK according to a manner of mapping the CSI-part 2;
- discarding the CSI-part 1 and the CSI-part 2, and mapping the second HARQ-ACK according to a manner of mapping the CSI-part 1;
- mapping the second HARQ-ACK and the CSI-part 1, and then mapping the CSI-part 2;
- discarding the CSI-part 2, mapping the second HARQ-ACK according to a manner of mapping the CSI-part 1, and mapping the CSI-part 1 according to a manner of mapping the CSI-part 2; and
- mapping the second HARQ-ACK according to the default mapping rule on a resource element RE adjacent to an RE occupied by the first HARQ-ACK.

Optionally, in embodiments of this application, in a case that the first rule includes discarding the CSI-part 2, and mapping the second HARQ-ACK according to a manner of mapping the CSI-part 2, the UCI transmission apparatus may first discard the CSI-part 2; map the high-priority first HARQ-ACK according to a HARQ-ACK formula and mapping rule in the related art; and calculate a corresponding RE for the low-priority second HARQ-ACK according to the manner of the CSI-part 2, and perform rate matching and RE mapping.

Optionally, in embodiments of this application, in a case that the first rule includes discarding the CSI-part 1 and the CSI-part 2, and mapping the second HARQ-ACK according to a manner of mapping the CSI-part 1, the UCI transmission apparatus may first discard the CSI-part 1 and the CSI-part 2; then map the high-priority first HARQ-ACK according to a HARQ-ACK formula and mapping rule in the related art; and calculate a corresponding RE for the low-priority second HARQ-ACK according to the manner of the CSI-part 1, and perform rate matching and RE mapping.

Optionally, in embodiments of this application, in a case that the first rule includes mapping the second HARQ-ACK and the CSI-part 1, and then mapping the CSI-part 2, the UCI transmission apparatus may first map the high-priority first HARQ-ACK according to a HARQ-ACK formula and mapping rule in the related art; then calculate a corresponding RE by jointly encoding the low-priority second HARQ-ACK and the CSI-part 1, and perform rate matching and RE mapping; and calculate an RE for the CSI-part 2 and perform mapping.

Optionally, in embodiments of this application, in a case that the first rule includes discarding the CSI-part 2, mapping the second HARQ-ACK according to a manner of mapping the CSI-part 1, and mapping the CSI-part 1 according to a manner of mapping the CSI-part 2, the UCI transmission apparatus may first discard the CSI-part 2; then map the high-priority first HARQ-ACK according to a HARQ-ACK formula and mapping rule in the related art; calculate a corresponding RE for the low-priority second HARQ-ACK according to the manner of the CSI-part 1, and perform rate matching and RE mapping; and then calculate a corresponding RE for the CSI-part 1 according to the manner of the CSI-part 2, and perform rate matching and RE mapping.

Optionally, in embodiments of this application, in a case that the first rule includes mapping the second HARQ-ACK according to the default mapping rule on a resource element RE adjacent to an RE occupied by the first HARQ-ACK, the UCI transmission apparatus first maps the high-priority first HARQ-ACK according to a HARQ-ACK formula and mapping rule in the related art, then excludes an RE in which the high-priority first HARQ-ACK is located for the low-priority second HARQ-ACK, and then performs mapping and RE mapping on a remaining resource adjacent to the first HARQ-ACK according to a manner in the related art.

It can be learned that, because the UCI transmission apparatus can map different UCI according to different rules in a case that the first UCI includes different UCI of different UCI types, service reliability of the UCI transmission apparatus can be improved.

Optionally, in embodiments of this application, step 201*a* may be replaced with the following step 201*b*.

Step 201*b*: In a case that the N uplink channels overlap on a time domain resource, the N uplink channels include a PUCCH, and a second condition is met, in the target multiplexing mode, the UCI transmission apparatus adjusts a puncture formula to A bits, and maps the first HARQ-ACK and the second HARQ-ACK based on an adjusted puncture formula.

In embodiments of this application, some of the A bits are used for mapping the first HARQ-ACK, and some bits are used for mapping the second HARQ-ACK. For example, the first T bits of the A bits are used for mapping the first HARQ-ACK, and the last P bits are used for mapping the second HARQ-ACK, where A, T, and P are all positive integers. For example, in a case that the N uplink channels overlap on a time domain resource, the N uplink channels include a PUCCH, and the second condition is met, in the target multiplexing mode, the UCI transmission apparatus adjusts the puncture formula to 4 bits, and maps the first HARQ-ACK and the second HARQ-ACK based on an adjusted puncture formula, where the first 2 bits of the 4 bits are used for mapping the first HARQ-ACK, and the last 2 bits are used for mapping the second HARQ-ACK.

Optionally, in embodiments of this application, the second condition may be as follows: The first HARQ-ACK includes 2 bits or fewer than 2 bits, and the second HARQ-ACK includes 2 bits or fewer than 2 bits.

Optionally, in embodiments of this application, A may be 4, for example, A bits are 4 bits; and T may be 2, for example, the first T bits are the first 2 bits, and the last P bits are the last 2 bits.

In embodiments of this application, in a case that the first high-priority HARQ-ACK includes 2 bits or fewer than 2 bits and the low-priority second HARQ-ACK includes 2 bits or fewer than 2 bits, the UCI transmission apparatus may change a puncture formula in the related art to 4 bits, where the first 2 bits are the first HARQ-ACK, and the last 2 bits are the second HARQ-ACK.

It can be learned that, because the UCI transmission apparatus can map different UCI according to different rules in a case that the first UCI includes different UCI of different UCI types, service reliability of the UCI transmission apparatus can be improved.

It should be noted that UCI with different priorities may be mapped to a PUSCH according to the following principles.

For example, HP A/N (namely, the high-priority first HARQ-ACK), LP A/N (namely, the low-priority second HARQ-ACK), and LP CSI (namely, low-priority CSI) are multiplexed on an LP PUSCH. There may be the following implementations.

Manner 1: The HP A/N is processed according to an existing A/N formula and mapping rule. A CSI part 2 is discarded. A corresponding RE is calculated for the LP A/N according to a manner of the CSI part 2, and rate matching and RE mapping are performed.

Manner 2: The HP A/N is processed according to an existing A/N formula and mapping rule. A corresponding RE is calculated for the LP A/N according to a manner of a CSI part 1, and rate matching and RE mapping are performed. CSI parts 1 and 2 are discarded.

Manner 3: The HP A/N is processed according to an existing A/N formula and mapping rule. A corresponding RE is calculated by jointly encoding the LP A/N and a CSI part 1, and rate matching and RE mapping are performed. Then an RE is calculated for a CSI part 2 and is mapped.

Manner 4: The HP A/N is processed according to an existing A/N formula and mapping rule. A corresponding RE is calculated for the LP A/N according to a manner of a CSI part 1, and rate matching and RE mapping are performed. A CSI part 2 is discarded. A corresponding RE is calculated for the CSI part 1 according to a manner of the CSI part 2, and rate matching and RE mapping are performed.

Manner 5: First, the HP A/N is processed according to an existing A/N manner. Then an RE in which the high-priority A/N is located is excluded, and then processing and RE mapping are performed on a remaining resource adjacent to the HP A/N according to an existing manner.

In some embodiments, HP A/N and LP A/N with different payload sizes may be processed in the following cases:

(1) A high-priority A/N (namely, HARQ-ACK) including 2 bits or fewer than 2 bits and a low-priority A/N including fewer than 2 bits may be multiplexed on a PUSCH in the following implementations.

Manner 1: The high-priority A/N is punctured according to an existing A/N formula and mapping rule. A channel state information (CSI) part 2 is discarded. A corresponding resource element (RE) is calculated for the low-priority A/N according to a manner of the CSI part 2, and rate matching and RE mapping are performed. A formula is as follows:

$$Q'_{LP\ ACK} = \min\left\{ \left\lceil \frac{(O_{LP\ ACK} + L_{LP\ ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL\text{-}SCH}-1} K_r} \right\rceil, \left\lceil \alpha \cdot \sum_{l=0}^{N_{symb,all}^{PUSCH}-1} M_{sc}^{UCI}(l) \right\rceil - Q'_{ACK} - Q'_{CSI\text{-}1} \right\}$$

$O_{LP\ ACK}$ is a quantity of bits of a low-priority HARQ-ACK. In a case that $O_{LP\ ACK} \geq 360$, $L_{LP\ ACK}=11$; otherwise, $L_{LP\ ACK}$ is a quantity of CRC bits of the low-priority HARQ-ACK, and $Q'_{ACK}$ is a quantity of symbols occupied by the high-priority A/N.

$$\beta_{offset}^{PUSCH} = \beta_{offset}^{LPACK}, \text{ and } C_{UL\text{-}SCH}$$

is a quantity of code blocks of a UL-SCH. $K_r$ is a size of an r-th code block.

$$M_{sc}^{PUSCH}$$

is scheduling bandwidth for PUSCH transmission, and is represented as a quantity of subcarriers.

$$M_{sc}^{PT-RS}(l)$$

is a quantity of subcarriers on an orthogonal frequency division multiplexing (OFDM) symbol l that carries a PTRS.

$$M_{sc}^{UCI}(l)$$

is a quantity of resource elements available for UCI transmission on the OFDM symbol l, where $$l = 0, 1, 2, \ldots, N_{symb,all}^{PUSCH} - 1.\ N_{symb,all}^{PUSCH}$$

is a total quantity of OFDM symbols, including all OFDM symbols used for demodulation reference signals (DMRS).

For any OFDM symbol that carries a DMRS, $$M_{SC}^{UCI}(1) = 0.$$

For any OFDM symbol that does not carry a DMRS, $$M_{sc}^{UCI}(1) = M_{sc}^{PUSCH} - M_{sc}^{PT-RS}(1).$$

For a low-priority HARQ-ACK on a PUSCH without a UL-SCH, a quantity of coded symbols per layer is as follows:

$$Q'_{LP\ ACK} = \sum_{l=0}^{N_{symb,all}^{PUSCH}-1} M_{sc}^{UCI}(l) - Q'_{ACK} - Q'_{CSI\text{-}1},$$

where $Q'_{ACK}$ is a quantity of symbols occupied by the high-priority A/N.

For a high-priority HARQ-ACK on a PUSCH (without a repetition type B) with a UL-SCH, a quantity of coded symbols per layer is as follows:

$$Q'_{ACK} = \min\left\{\left\lceil \frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL\text{-}SCH}-1} K_r} \right\rceil, \left\lceil \alpha \cdot \sum_{l=l_0}^{N_{symb,all}^{PUSCH}-1} M_{sc}^{UCI}(l) \right\rceil\right\}$$

$O_{ACK}$ is a quantity of bits of a high-priority HARQ-ACK. In a case that $O_{ACK} \geq 360$, $L_{ACK}=11$; otherwise, $L_{ACK}$ is a quantity of CRC bits of the HARQ-ACK.

$$\beta_{offset}^{PUSCH} = \beta_{offset}^{HPHARQ-ACK}.$$

$C_{UL\text{-}SCH}$ is a quantity of code blocks of a UL-SCH. $K_r$ is a size of an r-th code block.

$$M_{sc}^{PUSCH}$$

is scheduling bandwidth for PUSCH transmission, and is represented as a quantity of subcarriers.

$$M_{sc}^{PT-RS}(1)$$

is a quantity of subcarriers on an OFDM symbol 1 that carries a PTRS.

$$M_{sc}^{UCI}(1)$$

is a quantity of resource elements available for UCI transmission on the OFDM symbol l, where $$1 = 0, 1, 2, \ldots, N_{symb,all}^{PUSCH} - 1.\ N_{symb,all}^{PUSCH}$$

is a total quantity of OFDM symbols, including all OFDM symbols used for DMRSs.

For any OFDM symbol that carries a DMRS, $$M_{sc}^{UCI}(1) = 0.$$

For any OFDM symbol that does not carry a DMRS, $$M_{sc}^{UCI}(1) = M_{sc}^{PUSCH} - M_{sc}^{PT-RS}(1).$$

α is configured by using a higher-layer configuration parameter scaling.

$l_0$ is an index of the first OFDM symbol that does not carry a DMRS after the first DMRS symbol.

For a high-priority HARQ-ACK on a PUSCH without a UL-SCH, a quantity of coded symbols per layer is as follows:

$$Q'_{ACK} = \min\left\{\left\lceil \frac{(O_{ACK} + L_{ACK}) \cdot \beta_{offset}^{PUSCH}}{R \cdot Q_m} \right\rceil, \left\lceil \alpha \cdot \sum_{l=l_0}^{N_{symb,all}^{PUSCH}-1} M_{sc}^{UCI}(l) \right\rceil\right\}$$

$O_{ACK}$ is a quantity of bits of a high-priority HARQ-ACK. In a case that $O_{ACK} \geq 360$, $L_{ACK}=11$; otherwise, $L_{ACK}$ is a quantity of CRC bits of the HARQ-ACK.

$$\beta_{offset}^{PUSCH} = \beta_{offset}^{HP\ HARQ-ACK},$$

and $C_{UL-SCH}$ is a quantity of code blocks of a UL-SCH. $K_r$ is a size of an r-th code block.

$$M_{sc}^{PUSCH}$$

is scheduling bandwidth for PUSCH transmission, and is represented as a quantity of subcarriers.

$$M_{sc}^{PT-RS}(1)$$

is a quantity of subcarriers on an OFDM symbol 1 that carries a PTRS.

$$M_{sc}^{UCI}(1)$$

is a quantity of resource elements available for UCI transmission on the OFDM symbol 1, where $$1 = 0, 1, 2, \ldots, N_{symb,all}^{PUSCH} - 1.\ N_{symb,all}^{PUSCH}$$

is a total quantity of OFDM symbols, including all OFDM symbols used for DMRSs.

For any OFDM symbol that carries a DMRS, $$M_{sc}^{UCI}(1) = 0.$$

For any OFDM symbol that does not carry a DMRS, $$M_{sc}^{UCI}(I) = M_{sc}^{PUSCH} - M_{sc}^{PT-RS}(1).$$

α is configured by using a higher-layer configuration parameter scaling.

$l_0$ is an index of the first OFDM symbol that does not carry a DMRS after the first DMRS symbol.

R is a PUSCH bit rate. $Q_m$ is a PUSCH modulation order.

Manner 2: The high-priority A/N is punctured according to an existing A/N formula and mapping rule. A corresponding RE is calculated for the low-priority A/N according to a manner of a CSI part 1, and rate matching and RE mapping are performed. CSI parts 1 and 2 are discarded. A formula is as follows:

For a low-priority A/N on a PUSCH with a UL-SCH, a quantity of coded symbols per layer is as follows:

$$Q'_{LP\ ACK} = \min\left\{\left\lceil \frac{(O_{LP\ ACK} + L_{LP\ ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=0}^{N_{symb,all}^{PUSCH}-1} M_{sc}^{UCI}(l) \right\rceil - Q'_{ACK}\right\}$$

$O_{LP\ ACK}$ is a quantity of bits of a low-priority ACK. In a case that $O_{LP\ ACK} \geq 360$, $L_{LP\ ACK}=11$; otherwise, $L_{LP\ ACK}$ is a quantity of CRC bits of the low-priority ACK, and $Q'_{ACK}$ is a quantity of symbols occupied by the high-priority A/N.

$$\beta_{offset}^{PUSCH} = \beta_{offset}^{LP\ ACK}, \text{ and } C_{UL-SCH}$$

is a quantity of code blocks of a UL-SCH. $K_r$ is a size of an r-th code block.

$$M_{sc}^{PUSCH}$$

is scheduling bandwidth for PUSCH transmission, and is represented as a quantity of subcarriers.

$$M_{sc}^{PT-RS}(1)$$

is a quantity of subcarriers on an OFDM symbol 1 that carries a PTRS.

$$M_{sc}^{UCI}(1)$$

is a quantity of resource elements available for UCI transmission on the OFDM symbol 1, where $$1 = 0, 1, 2, \ldots, N_{symb,all}^{PUSCH} - 1.$$

$$N_{symb,all}^{PUSCH}$$

is a total quantity of OFDM symbols, including all OFDM symbols used for DMRSs.

For any OFDM symbol that carries a DMRS, $$M_{sc}^{UCI}(1) = 0.$$

For any OFDM symbol that does not carry a DMRS, $$M_{sc}^{UCI}(1) = M_{sc}^{PUSCH} - M_{sc}^{PT-RS}(1).$$

α is configured by using a higher-layer configuration parameter scaling.

For a low-priority A/N on a PUSCH without a UL-SCH, a quantity of coded symbols per layer is as follows:

$$Q'_{LP\ ACK} = \min\left\{\left\lceil \frac{(O_{LP\ ACK} + L_{LP\ ACK}) \cdot \beta_{offset}^{PUSCH}}{R \cdot Q_m} \right\rceil, \sum_{l=0}^{N_{symb,all}^{PUSCH}-1} M_{sc}^{UCI}(l) - Q'_{ACK}\right\}$$

$O_{LP\ ACK}$ is a quantity of bits of a low-priority ACK. In a case that $O_{LP\ ACK} \geq 360$, $L_{LP\ ACK}=11$; otherwise, $L_{LP\ ACK}$ is a quantity of CRC bits of the low-priority ACK, and $Q'_{ACK}$ is a quantity of symbols occupied by the high-priority A/N.

$$\beta_{offset}^{PUSCH} = \beta_{offset}^{LP\ ACK}, \text{ and } C_{UL-SCH}$$

is a quantity of code blocks of a UL-SCH. $K_r$ is a size of an r-th code block.

$$M_{sc}^{PUSCH}$$

is scheduling bandwidth for PUSCH transmission, and is represented as a quantity of subcarriers.

$$M_{sc}^{PT-RS}(1)$$

is a quantity of subcarriers on an OFDM symbol 1 that carries a PTRS.

$$M_{sc}^{UCI}(1)$$

is a quantity of resource elements available for UCI transmission on the OFDM symbol l, where $$l = 0, 1, 2, \ldots, N_{symb,all}^{PUSCH} - 1.$$

$$N_{symb,all}^{PUSCH}$$

is a total quantity of OFDM symbols, including all OFDM symbols used for DMRSs.

For any OFDM symbol that carries a DMRS, $$M_{sc}^{UCI}(1) = 0.$$

For any OFDM symbol that does not carry a DMRS, $$M_{sc}^{UCI}(1) = M_{sc}^{PUSCH} - M_{sc}^{PT-RS}(1).$$

α is configured by using a higher-layer configuration parameter scaling.

R is a PUSCH bit rate. $Q_m$ is a PUSCH modulation order.

Manner 3: The high-priority A/N is punctured according to an existing A/N formula and mapping rule. A corresponding RE is calculated by jointly encoding the low-priority A/N and a CSI part 1, and rate matching and RE mapping are performed. Then an RE is calculated for a CSI part 2 and is mapped.

For a low-priority A/N and a low-priority CSI part 1 on a PUSCH with a UL-SCH, a quantity of coded symbols per layer is as follows:

$$Q'_{LP\ ACK+CSI\ part1} = \min\left\{\left\lceil \frac{(O_{LP\ ACK+CSI\ part1} + L_{LP\ ACK+CSI\ part1}) \cdot \beta_{offset}^{PUSCH} \cdot \sum_{l=0}^{N_{symb,all}^{PUSCH}-1} M_{sc}^{UCI}(l)}{\sum_{r=0}^{C_{UL\text{-}SCH}-1} K_r} \right\rceil, \left\lceil \alpha \cdot \sum_{l=0}^{N_{symb,all}^{PUSCH}-1} M_{sc}^{UCI}(l) \right\rceil - Q'_{ACK}\right\}$$

$O_{LP\ ACK+CSI\ part\ 1}$ is a quantity of bits of a low-priority ACK and a low-priority CSI part 1. In a case that $O_{LP\ ACK+CSI\ part\ 1} \geq 360$, $L_{LP\ ACK+CSI\ part\ 1}=11$; otherwise, $L_{LP\ ACK+CSI\ part\ 1}$ is a sum of quantities of CRC bits of the low-priority ACK and the low-priority CSI part 1, and $Q'_{ACK}$ is a quantity of symbols occupied by the high-priority A/N.

$$\beta_{offset}^{PUSCH} = \beta_{offset}^{LP\ ACK}, \text{ and } C_{UL-SCH}$$

is a quantity of code blocks of a UL-SCH. $K_r$ is a size of an r-th code block.

$$M_{sc}^{PUSCH}$$

is scheduling bandwidth for PUSCH transmission, and is represented as a quantity of subcarriers.

$$M_{sc}^{PT-RS}(1)$$

is a quantity of subcarriers on an OFDM symbol 1 that carries a PTRS.

$$M_{sc}^{UCI}(1)$$

is a quantity of resource elements available for UCI transmission on the OFDM symbol l, where $$l=0,1,2,\ldots,N_{symb,all}^{PUSCH}-1.$$

$$N_{symb,all}^{PUSCH}$$

is a total quantity of OFDM symbols, including all OFDM symbols used for DMRSs.

For any OFDM symbol that carries a DMRS, $$M_{sc}^{UCI}(1)=0.$$

For any OFDM symbol that does not carry a DMRS, $$M_{sc}^{UCI}(1)=M_{sc}^{PUSCH}-M_{sc}^{PT-RS}(1).$$

α is configured by using a higher-layer configuration parameter scaling.

For a low-priority A/N and a low-priority CSI part 1 on a PUSCH without a UL-SCH, a quantity of coded symbols per layer is as follows:

$$Q'_{LP\ ACK+CSI\ part1}=\min\left\{\left\lceil\frac{(O_{LP\ ACK+CSI\ part1}+L_{LP\ ACK+CSI\ part1})\cdot\beta_{offset}^{PUSCH}}{R\cdot Q_m}\right\rceil,\ \sum_{l=0}^{N_{symb,all}^{PUSCH}-1}M_{sc}^{UCI}(l)-Q'_{ACK}\right\}$$

$O_{LP\ ACK+CSI\ part\ 1}$ is a quantity of bits of a low-priority ACK and a low-priority CSI part 1. In a case that $O_{LP\ ACK+CSI\ part\ 1}>360$, $L_{LP\ ACK+CSI\ part\ 1}=11$; otherwise, $L_{LP\ ACK+CSI\ part\ 1}$ is a quantity of CRC bits of the low-priority ACK and the low-priority CSI part 1, and $Q'_{ACK}$ is a quantity of symbols occupied by the high-priority A/N.

$$\beta_{offset}^{PUSCH}=\beta_{offset}^{LP\ ACK},\text{ and }C_{UL-SCH}$$

is a quantity of code blocks of a UL-SCH. $K_r$ is a size of an r-th code block.

$$M_{sc}^{PUSCH}$$

is scheduling bandwidth for PUSCH transmission, and is represented as a quantity of subcarriers.

$$M_{sc}^{PT-RS}(1)$$

is a quantity of subcarriers on an OFDM symbol 1 that carries a PTRS.

$$M_{sc}^{UCI}(1)$$

is a quantity of resource elements available for UCI transmission on the OFDM symbol l, where $$l=0,1,2,\ldots,N_{symb,all}^{PUSCH}-1.$$

$$N_{symb,all}^{PUSCH}$$

is a total quantity of OFDM symbols, including all OFDM symbols used for DMRSs.

For any OFDM symbol that carries a DMRS, $$M_{sc}^{UCI}(l)=0.$$

For any OFDM symbol that does not carry a DMRS, $$M_{sc}^{UCI}(l)=M_{sc}^{PUSCH}-M_{sc}^{PT-RS}(l).$$

α is configured by using a higher-layer configuration parameter scaling.

R is a PUSCH bit rate. $Q_m$ is a PUSCH modulation order.

Manner 4: The high-priority A/N is punctured according to an existing A/N formula and mapping rule. A corresponding RE is calculated for the low-priority A/N according to a manner of a CSI part 1, and rate matching and RE mapping are performed. A CSI part 2 is discarded. In a case that the CSI part 1 exists, a corresponding RE is calculated for the CSI part 1 according to a manner of the CSI part 2, and rate matching and RE mapping are performed. A formula is as follows:

For a low-priority A/N on a PUSCH with a UL-SCH, a quantity of coded symbols per layer is as follows:

$$Q'_{LP\ ACK}=\min\left\{\left\lceil\frac{(O_{LP\ ACK}+L_{LP\ ACK})\cdot\beta_{offset}^{PUSCH}\cdot\sum_{l=0}^{N_{symb,all}^{PUSCH}-1}M_{sc}^{UCI}(l)}{\sum_{r=0}^{C_{UL-SCH}-1}K_r}\right\rceil,\ \left\lceil\alpha\cdot\sum_{l=0}^{N_{symb,all}^{PUSCH}-1}M_{sc}^{UCI}(l)\right\rceil-Q'_{ACK}\right\}$$

$O_{LP\ ACK}$ is a quantity of bits of a low-priority ACK. In a case that $O_{LP\ ACK}\geq 360$, $L_{LP\ ACK}=11$; otherwise, $L_{LP\ ACK}$ is a quantity of CRC bits of the low-priority ACK, and $Q'_{ACK}$ is a quantity of symbols occupied by the high-priority A/N.

$$\beta_{offset}^{PUSCH}=\beta_{offset}^{LPACK},\text{ and }C_{UL-SCH}$$

is a quantity of code blocks of a UL-SCH. $K_r$ is a size of an $r^{th}$ code block.

$$M_{sc}^{PUSCH}$$

is scheduling bandwidth for PUSCH transmission, and is represented as a quantity of subcarriers.

$$M_{sc}^{PT-RS}(l)$$

is a quantity of subcarriers on an OFDM symbol l that carries a PTRS.

$$M_{sc}^{UCI}(l)$$

is a quantity of resource elements available for UCI transmission on the OFDM symbol l, where $$l = 0, 1, 2, \ldots, N_{symb,all}^{PUSCH} - 1.$$

$$N_{symb,all}^{PUSCH}$$

is a total quantity of OFDM symbols, including all OFDM symbols used for DMRSs.

For any OFDM symbol that carries a DMRS, $$M_{sc}^{UCI}(l) = 0.$$

For any OFDM symbol that does not carry a DMRS, $$M_{sc}^{UCI}(l) = M_{sc}^{PUSCH} - M_{sc}^{PT-RS}(l).$$

α is configured by using a higher-layer configuration parameter scaling.

For a low-priority A/N on a PUSCH without a UL-SCH, a quantity of coded symbols per layer is as follows:

$$Q'_{LP\ ACK} = \min\left\{\left\lceil \frac{(O_{LP\ ACK} + L_{LP\ ACK}) \cdot \beta_{offset}^{PUSCH}}{R \cdot Q_m} \right\rceil, \sum_{l=0}^{N_{symb,all}^{PUSCH}-1} M_{sc}^{UCI}(l) - Q'_{ACK}\right\}$$

$O_{LP\ ACK}$ is a quantity of bits of a low-priority ACK. In a case that $O_{LP\ ACK} \geq 360$, $L_{LP\ ACK}=11$; otherwise, $L_{LP\ ACK}$ is a quantity of CRC bits of the low-priority ACK, and $Q'_{ACK}$ is a quantity of symbols occupied by the high-priority A/N.

$$\beta_{offset}^{PUSCH} = \beta_{offset}^{LPACK}, \text{ and } C_{UL-SCH}$$

is a quantity of code blocks of a UL-SCH. $K_r$ is a size of an r-th code block.

$$M_{sc}^{PUSCH}$$

is scheduling bandwidth for PUSCH transmission, and is represented as a quantity of subcarriers.

$$M_{sc}^{PT-RS}(l)$$

is a quantity of subcarriers on an OFDM symbol l that carries a PTRS.

$$M_{sc}^{UCI}(l)$$

is a quantity of resource elements available for UCI transmission on the OFDM symbol l, where $$l = 0, 1, 2, \ldots, N_{symb,all}^{PUSCH} - 1.$$

$$N_{symb,all}^{PUSCH}$$

is a total quantity of OFDM symbols, including all OFDM symbols used for DMRSs.

For any OFDM symbol that carries a DMRS, $$M_{sc}^{UCI}(l) = 0.$$

For any OFDM symbol that does not carry a DMRS, $$M_{sc}^{UCI}(l) = M_{sc}^{PUSCH} - M_{sc}^{PT-RS}(l).$$

α is configured by using a higher-layer configuration parameter scaling.

R is a PUSCH bit rate. $Q_m$ is a PUSCH modulation order.

For a CSI part 1 on a PUSCH with a UL-SCH, a quantity of coded symbols per layer is as follows:

$$Q'_{CSI\text{-}1} = \min\left\{\left\lceil \frac{(O_{CSI\text{-}1} + L_{CSI\text{-}1}) \cdot \beta_{offset}^{PUSCH} \cdot \sum_{l=0}^{N_{symb,all}^{PUSCH}-1} M_{sd}^{UCI}(l)}{\sum_{r=0}^{C_{UL\text{-}SCH}-1} K_r} \right\rceil, \left\lceil \alpha \cdot \sum_{l=0}^{N_{symb,all}^{PUSCH}-1} M_{sc}^{UCI}(l) \right\rceil - Q'_{ACK} - Q'_{LP\ ACK}\right\}$$

$O_{CSI\text{-}1}$ is a quantity of bits of the CSI part 1. In a case that $O_{CSI\text{-}1} \geq 360$, $L_{CSI\text{-}1}=11$; otherwise, $L_{CSI\text{-}1}$ is a quantity of CRC bits of the CSI part 1, and $Q'_{ACK}$ is a quantity of symbols occupied by the high-priority A/N.

$\beta_{offset}^{PUSCH} = \beta_{offset}^{CSI-part\ 1}$, and $C_{UL-SCH}$ is a quantity of code blocks of a UL-SCH. $K_r$ is a size of an r-th code block.

$$M_{sc}^{PUSCH}$$

is scheduling bandwidth for PUSCH transmission, and is represented as a quantity of subcarriers.

$$M_{sc}^{PT-RS}(l)$$

is a quantity of subcarriers on an OFDM symbol 1 that carries a PTRS.

$$M_{sc}^{UCI}(l)$$

is a quantity of resource elements available for UCI transmission on the OFDM symbol l, where $$l = 0, 1, 2, \ldots, N_{symb,all}^{PUSCH} - 1.$$

$$N_{symb,all}^{PUSCH}$$

is a total quantity of OFDM symbols, including all OFDM symbols used for DMRSs.

For any OFDM symbol that carries a DMRS, $$M_{sc}^{UCI}(l) = 0.$$

For any OFDM symbol that does not carry a DMRS, $$M_{sc}^{UCI}(l) = M_{sc}^{PUSCH} - M_{sc}^{PT-RS}(l).$$

For a CSI part 1 on a PUSCH without a UL-SCH, a quantity of coded symbols per layer is as follows:

$$Q'_{CSI\text{-}1} = \sum_{l=0}^{N_{symb,all}^{PUSCH}-1} M_{sc}^{UCI}(l) - Q'_{ACK} - Q'_{LP\ ACK}$$

$Q'_{ACK}$ is a quantity of symbols occupied by the high-priority A/N.

$$M_{sc}^{UCI}(l)$$

is a quantity of resource elements available for UCI transmission on the OFDM symbol l.

$$N_{symb,all}^{PUSCH}$$

is a total quantity of OFDM symbols, including all OFDM symbols used for DMRSs.

Manner 5: First, the high-priority A/N is processed according to an existing A/N puncture manner. Then an RE in which the high-priority A/N is located is excluded for the low-priority A/N, and then puncturing and RE mapping are performed on a remaining resource adjacent to the high-priority A/N based on an existing formula.

Manner 6: An existing A/N puncture formula is changed to 4 bits, where the first 2 bits are used for a high-priority A/N, and the last 2 bits are used for a low-priority A/N. In some embodiments:

For a high-priority HARQ-ACK and a low-priority HARQ-ACK on a PUSCH (without a repetition type B) with a UL-SCH, a quantity of coded symbols per layer is as follows:

$$Q'_{ACK} = \min\left\{\left\lceil \frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL\text{-}SCH}-1} K_r} \right\rceil, \left\lceil \alpha \cdot \sum_{l=l_0}^{N_{symb,all}^{PUSCH}-1} M_{sc}^{UCI}(l) \right\rceil\right\}$$

$O_{ACK}$ includes 4 bits, where the first 2 bits are used for a high-priority A/N, and the last 2 bits are used for a low-priority A/N.

$\beta_{offset}^{PUSCH}$ includes $\beta_{offset}^{HARQ-ACK}$ used for the high-priority HARQ-ACK and the low-priority HARQ-ACK. $C_{UL\text{-}SCH}$ is a quantity of code blocks of a UL-SCH. $K_r$ is a size of an r-th code block.

$$M_{sc}^{PUSCH}$$

is scheduling bandwidth for PUSCH transmission, and is represented as a quantity of subcarriers.

$$M_{sc}^{PT-RS}(l)$$

is a quantity of subcarriers on an OFDM symbol 1 that carries a PTRS.

$$M_{sc}^{UCI}(l)$$

is a quantity of resource elements available for UCI transmission on the OFDM symbol l, where $$l = 0, 1, 2, \ldots, N_{symb,all}^{PUSCH} - 1.$$

$$N_{symb,all}^{PUSCH}$$

is a total quantity of OFDM symbols, including all OFDM symbols used for DMRSs.

For any OFDM symbol that carries a DMRS, $$M_{sc}^{UCI}(l) = 0.$$

For any OFDM symbol that does not carry a DMRS, $$M_{sc}^{UCI}(l) = M_{sc}^{PUSCH} - M_{sc}^{PT-RS}(l).$$

α is configured by using a higher-layer configuration parameter scaling.

$l_0$ is an index of the first OFDM symbol that does not carry a DMRS after the first DMRS symbol.

For a high-priority HARQ-ACK and a low-priority HARQ-ACK on a PUSCH without a UL-SCH, a quantity of coded symbols per layer is as follows:

$$Q'_{ACK} = \min\left\{\left\lceil \frac{(O_{ACK} + L_{ACK}) \cdot \beta_{offset}^{PUSCH}}{R \cdot Q_m} \right\rceil, \left\lceil \alpha \cdot \sum_{1=l_0}^{N_{symb,all}^{PUSCH}-1} M_{sc}^{UCI}(l) \right\rceil\right\}$$

$O_{ACK}$ includes 4 bits, where the first 2 bits are used for a high-priority A/N, and the last 2 bits are used for a low-priority A/N.

$$\beta_{offset}^{PUSCH} \text{ includes } \beta_{offset}^{HARQ-ACK}$$

used for the high-priority HARQ-ACK and the low-priority HARQ-ACK. $C_{UL-SCH}$ is a quantity of code blocks of a UL-SCH. $K_r$ is a size of an r-th code block.

$$M_{sc}^{PUSCH}$$

is scheduling bandwidth for PUSCH transmission, and is represented as a quantity of subcarriers.

$$M_{sc}^{PT-RS}(l)$$

is a quantity of subcarriers on an OFDM symbol l that carries a PTRS.

$$M_{sc}^{UCI}(l)$$

is a quantity of resource elements available for UCI transmission on the OFDM symbol l, where $$l = 0, 1, 2, \ldots, N_{symb,all}^{PUSCH} - 1.$$

$$N_{symb,all}^{PUSCH}$$

is a total quantity of OFDM symbols, including all OFDM symbols used for DMRSs.

For any OFDM symbol that carries a DMRS, $$M_{sc}^{UCI}(l) = 0.$$

For any OFDM symbol that does not carry a DMRS, $$M_{sc}^{UCI}(l) = M_{sc}^{PUSCH} - M_{sc}^{PT-RS}(l).$$

α is configured by using a higher-layer configuration parameter scaling.

$l_0$ is an index of the first OFDM symbol that does not carry a DMRS after the first DMRS symbol.

R is a PUSCH bit rate. $Q_m$ is a PUSCH modulation order.

(2) A high-priority HP A/N including 2 bits or fewer than 2 bits and a low-priority LP A/N including more than 2 bits may be multiplexed on a PUSCH in the following implementations.

Manner 1: The HP A/N is punctured according to an existing A/N formula and mapping rule. A CSI part 2 is discarded. A corresponding RE is calculated for the LP A/N according to a manner of the CSI part 2, and rate matching and RE mapping are performed. For a formula, refer to the foregoing manner 1. Details are not described herein again.

Manner 2: The HP A/N is punctured according to an existing A/N formula and mapping rule. A corresponding RE is calculated for the LP A/N according to a manner of a CSI part 1, and rate matching and RE mapping are performed. CSI parts 1 and 2 are discarded. For a formula, refer to the foregoing manner 2. Details are not described herein again.

Manner 3: The HP A/N is punctured according to an existing A/N formula and mapping rule. A corresponding RE is calculated by jointly encoding the LP A/N and a CSI part 1, and rate matching and RE mapping are performed. Then an RE is calculated for a CSI part 2 and is mapped. For a formula, refer to the foregoing manner 3. Details are not described herein again.

Manner 4: The HP A/N is punctured according to an existing A/N formula and mapping rule. A corresponding RE is calculated for the LP A/N according to a manner of a CSI part 1, and rate matching and RE mapping are performed. A CSI part 2 is discarded. In a case that the CSI part 1 exists, a corresponding RE is calculated for the CSI part 1 according to a manner of the CSI part 2, and rate matching and RE mapping are performed. For a formula, refer to the foregoing manner 4. Details are not described herein again.

Manner 5: First, the HP A/N is processed according to an existing A/N puncture manner. Then an RE in which the high-priority A/N is located is excluded for the LP A/N, and then rate matching and RE mapping are performed on a remaining resource adjacent to the HP A/N based on an existing formula.

(3) A high-priority HP A/N including more than 2 bits and a low-priority LP A/N including 2 bits or fewer than 2 bits may be multiplexed on a PUSCH in the following implementations.

Manner 1: Rate matching is performed on the HP A/N according to an existing A/N formula and mapping rule. A CSI part 2 is discarded. A corresponding RE is calculated for the LP A/N according to a manner of the CSI part 2, and rate matching and RE mapping are performed. For a formula, refer to the foregoing manner 1. Details are not described herein again.

Manner 2: Rate matching is performed on the HP A/N according to an existing A/N formula and mapping rule. A corresponding RE is calculated for the LP A/N according to a manner of a CSI part 1, and rate matching and RE mapping are performed. CSI parts 1 and 2 are discarded. For a formula, refer to the foregoing manner 2. Details are not described herein again.

Manner 3: Rate matching is performed on the HP A/N according to an existing A/N formula and mapping rule. In a case that low-priority CSI exists, a corresponding RE is calculated by jointly encoding the LP A/N and a CSI part 1, and rate matching and RE mapping are performed. Then an RE is calculated for a CSI part 2 and is mapped. For a formula, refer to the foregoing manner 3. Details are not described herein again.

Manner 4: Rate matching is performed on the HP A/N according to an existing A/N formula and mapping rule. A corresponding RE is calculated for the LP A/N according to a manner of a CSI part 1, and rate matching and RE mapping are performed. A CSI part 2 is discarded. In a case that the CSI part 1 exists, a corresponding RE is calculated for the CSI part 1 according to a manner of the CSI part 2, and rate matching and RE mapping are performed. For a formula, refer to the foregoing manner 4. Details are not described herein again.

Manner 5: First, the HP A/N is processed according to an existing A/N rate matching manner. Then an RE in which the high-priority A/N is located is excluded for the LP A/N, and then puncturing and RE mapping are performed on a remaining resource adjacent to the HP A/N based on an existing formula.

Manner 6: First, the LP A/N is punctured according to an existing A/N formula and mapping rule, and corresponding mapping is performed by using a reserved RE. Then rate matching is performed on the HP A/N according to an existing A/N formula and mapping rule, and mapping is performed on a resource excluding a resource reserved for the LP A/N. For a formula, refer to the foregoing descriptions. Details are not described herein again.

(4) A high-priority HP A/N including more than 2 bits and a low-priority LP A/N including more than 2 bits may be multiplexed on a PUSCH in the following implementations.

Manner 1: Rate matching is performed on the HP A/N according to an existing A/N formula and mapping rule. A CSI part 2 is discarded. A corresponding RE is calculated for the LP A/N according to a manner of the CSI part 2, and rate matching and RE mapping are performed. For a formula, refer to the foregoing manner 1. Details are not described herein again.

Manner 2: Rate matching is performed on the HP A/N according to an existing A/N formula and mapping rule. A corresponding RE is calculated for the LP A/N according to a manner of a CSI part 1, and rate matching and RE mapping are performed. CSI parts 1 and 2 are discarded. For a formula, refer to the foregoing manner 2. Details are not described herein again.

Manner 3: Rate matching is performed on the HP A/N according to an existing A/N formula and mapping rule. In a case that low-priority CSI exists, a corresponding RE is calculated by jointly encoding the LP A/N and a CSI part 1, and rate matching and RE mapping are performed. Then an RE is calculated for a CSI part 2 and is mapped. For a formula, refer to the foregoing manner 3. Details are not described herein again.

Manner 4: Rate matching is performed on the HP A/N according to an existing A/N formula and mapping rule. A corresponding RE is calculated for the LP A/N according to a manner of a CSI part 1, and rate matching and RE mapping are performed. A CSI part 2 is discarded. In a case that the CSI part 1 exists, a corresponding RE is calculated for the CSI part 1 according to a manner of the CSI part 2, and rate matching and RE mapping are performed. For a formula, refer to the foregoing manner 4. Details are not described herein again.

Manner 5: First, the HP A/N is processed according to an existing A/N rate matching manner. Then rate matching and RE mapping are performed for the LP A/N on a remaining RE resource adjacent to the HP A/N based on an existing formula. For a formula, refer to the foregoing descriptions. Details are not described herein again.

For example, an HP A/N, an LP A/N, and HP CSI are multiplexed on an HP PUSCH. There may be the following implementations.

Manner 1: HP UCI is processed according to an existing UCI formula and mapping rule, and the LP A/N is discarded.

Optionally, in embodiments of this application, with reference to FIG. 2, as shown in FIG. 4, before "the UCI transmission apparatus transmits M pieces of UCI to-be-carried on the N uplink channels on a target uplink channel in the N uplink channels" in step 102, the UCI transmission method provided in embodiments of this application may further include the following step 301, and step 102 may be implemented by the following step 102*b*.

Step 301: In a case that the N uplink channels overlap on a time domain resource and a third condition is met, the UCI transmission apparatus cancels UCI transmission on a first uplink channel.

Optionally, in embodiments of this application, the third condition includes:

the target multiplexing mode is allowing multiplexing between PUCCHs with different priorities;

the N uplink channels include X PUCCHs and Y PUSCHs, where X is a positive integer, and Y is a positive integer; and the X PUCCHs do not include a high-priority PUCCH, and the Y PUSCHs include a high-priority PUSCH.

In embodiments of this application, the first uplink channel is the X PUCCHs.

As shown in Table 7, in a case that the third condition is met, the UCI transmission apparatus cancels UCI transmission on the first uplink channel.

TABLE 7

| Example | Cell index | N uplink channels overlap | Actually transmitted channel and UCI in a case that multiplexing between PUCCHs with different priorities is allowed | Scheme description |
|---|---|---|---|---|
| Case 1 | C1 | LP PUCCH | | UCI transmission on an LP PUCCH is canceled, and the UCI transmission apparatus transmits an HP PUSCH. |
| | C2 | HP PUSCH | HP PUSCH | |

As shown in Table 7, in the case 1, the N uplink channels include X PUCCHs and Y PUSCHs, where X is a positive integer (namely, 1), Y is a positive integer (namely, 1), the PUCCH includes a low-priority PUCCH, and the PUSCH includes a high-priority PUSCH. Therefore, in a case that the PUCCH and the PUSCH overlap on a time domain resource, the UCI transmission apparatus may cancel transmission of the low-priority PUCCH, and transmit the high-priority PUSCH.

Optionally, in embodiments of this application, the third condition includes:

the target multiplexing mode is allowing multiplexing between PUCCHs and PUSCHs with different priorities; and the N uplink channels include only X PUCCHs.

In embodiments of this application, the first uplink channel is a low-priority PUCCH of the X PUCCHs.

As shown in Table 8, in a case that the third condition is met, the UCI transmission apparatus cancels UCI transmission on the first uplink channel.

TABLE 8

| Example | Cell index | N uplink channels overlap | Actually transmitted channel and UCI in a case that multiplexing between PUCCHs and PUSCHs with different priorities is allowed | Scheme description |
|---|---|---|---|---|
| Case 1 | C1 | LP PUCCH | | UCI transmission on an LP PUCCH is canceled, and the UCI transmission apparatus transmits an HP PUCCH. |
| | C2 | HP PUCCH | HP PUCCH | |

As shown in Table 8, in the case 1, the N uplink channels include X PUCCHs and Y PUSCHs, where X is a positive integer (namely, 2), Y is 0, the two PUCCHs include a low-priority PUCCH and a high-priority PUCCH. Therefore, in a case that the two PUCCHs overlap on a time domain resource, the UCI transmission apparatus may cancel transmission of the low-priority PUCCH, and transmit the high-priority PUCCH.

Step 102*b*: The UCI transmission apparatus transmits the M pieces of UCI on the target uplink channel in the N uplink channels.

It can be learned that, in a case that the N uplink channels include a PUCCH and the third condition is met, the UCI transmission apparatus may cancel UCI transmission on the first uplink channel, so that transmission of a high-priority service can be ensured. In this way, user experience of using a service can be improved.

It should be noted that the UCI transmission method provided in embodiments of this application may be performed by a UCI transmission apparatus, or by a control module that is in the UCI transmission apparatus and that is configured to perform the UCI transmission method. In embodiments of this application, a UCI transmission apparatus provided in embodiments of this application is described by using an example in which the UCI transmission apparatus performs the UCI transmission method.

Figure 5:
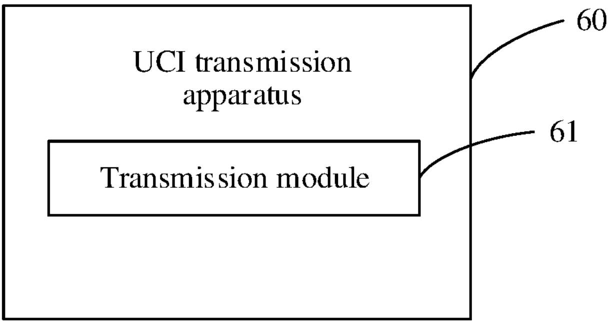
FIG. 5 is a first schematic structural diagram of a UCI transmission apparatus according to an embodiment of this application.

FIG. 5 is a schematic diagram of a possible structure of a UCI transmission apparatus according to an embodiment of this application. As shown in FIG. 5, the UCI transmission apparatus 60 may include a transmission module 61.

The transmission module 61 is configured to: in a case that N uplink channels overlap on a time domain resource, transmit M pieces of UCI to-be-carried on the N uplink channels on a target uplink channel in the N uplink channels, where both N and M are positive integers; and the target uplink channel is determined based on at least one of the following: priorities of the N uplink channels, or channel types of the N uplink channels.

Figure 6:
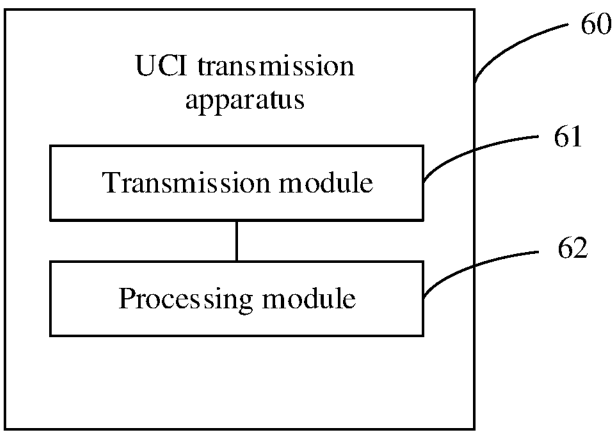
FIG. 6 is a second schematic structural diagram of a UCI transmission apparatus according to an embodiment of this application.

In a possible implementation, the target uplink channel is determined based on the priorities of the N uplink channels and the channel types of the N uplink channels. With reference to FIG. 5, as shown in FIG. 6, the UCI transmission apparatus 60 provided in embodiments of this application may further include a processing module 62. The processing module 62 is configured to: in a case that the N uplink channels include a PUCCH, multiplex first UCI on the target uplink channel in a target multiplexing mode, where the first UCI includes UCI with a same type in the M pieces of UCI; the target multiplexing mode is configured by a network side device; and the target multiplexing mode includes at least one of the following: allowing multiplexing between PUCCHs with different priorities, or allowing multiplexing between PUCCHs and PUSCHs with different priorities.

In a possible implementation, the target multiplexing mode is allowing multiplexing between PUCCHs with different priorities, the N uplink channels include X PUCCHs and Y PUSCHs, and the first UCI includes UCI with a same type that is carried on the X PUCCHs. In a case that X is a positive integer, Y is 0, and the X PUCCHs include a low-priority PUCCH and a high-priority PUCCH, the target uplink channel is the high-priority PUCCH; in a case that X is a positive integer, Y is a positive integer, the X PUCCHs include a low-priority PUCCH and a high-priority PUCCH, and the Y PUSCHs do not include a high-priority PUSCH, the target uplink channel is the high-priority PUCCH; in a case that X is a positive integer, Y is a positive integer, the X PUCCHs include a low-priority PUCCH and a high-priority PUCCH, and the Y PUSCHs include a high-priority PUSCH, the target uplink channel is the high-priority PUSCH; and in a case that X is a positive integer, Y is a positive integer, the X PUCCHs do not include a high-priority PUCCH, and the Y PUSCHs do not include a high-priority PUSCH, the target uplink channel is the low-priority PUSCH.

In a possible implementation, the target multiplexing mode is allowing multiplexing between PUCCHs and PUSCHs with different priorities, the N uplink channels include X PUCCHs and Y PUSCHs, and the first UCI includes UCI with a same type that is carried on the X PUCCHs. In a case that Y is a positive integer, the target uplink channel is a high-priority PUSCH or a low-priority PUSCH of the Y PUSCHs.

In a possible implementation, the target multiplexing mode includes: allowing multiplexing between PUCCHs with different priorities, and allowing multiplexing between PUCCHs and PUSCHs with different priorities; the N uplink channels include X PUCCHs and Y PUSCHs; and the first UCI includes UCI with a same type that is carried on the X PUCCHs. In a case that X is a positive integer and Y is 0, the target uplink channel is a high-priority PUCCH of the X PUCCHs; in a case that X is a positive integer, Y is a positive integer, the X PUCCHs include a low-priority PUCCH and a high-priority PUCCH, and the Y PUSCHs include a high-priority PUSCH, the target uplink channel is the high-priority PUSCH; and in a case that X is a positive integer, Y is a positive integer, the X PUCCHs include a low-priority PUCCH and a high-priority PUCCH, and the Y PUSCHs do not include a high-priority PUSCH, the target uplink channel is the low-priority PUSCH.

In a possible implementation, the first UCI includes a first HARQ-ACK to-be-carried on a high-priority uplink channel, a second HARQ-ACK to-be-carried on a low-priority uplink channel, and a CSI-part 1 to-be-carried on the low-priority uplink channel, and the target uplink channel is a low-priority PUSCH. The processing module 62 is configured to: in a case that a first condition is met, map the first HARQ-ACK according to a default mapping rule, and map the second HARQ-ACK according to the first rule based on the CSI-part 1.

In a possible implementation, the first UCI further includes a CSI-part 2 to-be-carried on the low-priority uplink channel; and the first rule includes any one of the following: discarding the CSI-part 2, and mapping the second HARQ-ACK according to a manner of mapping the CSI-part 2; discarding the CSI-part 1 and the CSI-part 2, and mapping the second HARQ-ACK according to a manner of mapping the CSI-part 1; mapping the second HARQ-ACK and the CSI-part 1, and then mapping the CSI-part 2; discarding the CSI-part 2, mapping the second HARQ-ACK according to a manner of mapping the CSI-part 1, and mapping the CSI-part 1 according to a manner of mapping the CSI-part 2; and mapping the second HARQ-ACK according to the default mapping rule on a resource element RE adjacent to an RE occupied by the first HARQ-ACK.

In a possible implementation, the processing module 62 is further configured to: in a case that a second condition is met, adjust a puncture formula to A bits, and map the first HARQ-ACK and second HARQ-ACK based on an adjusted puncture formula, where the first T bits of the A bits are used for mapping the first HARQ-ACK, the last P bits are used for mapping the second HARQ-ACK, and A, T and P are all positive integers.

Figures 7, 8:
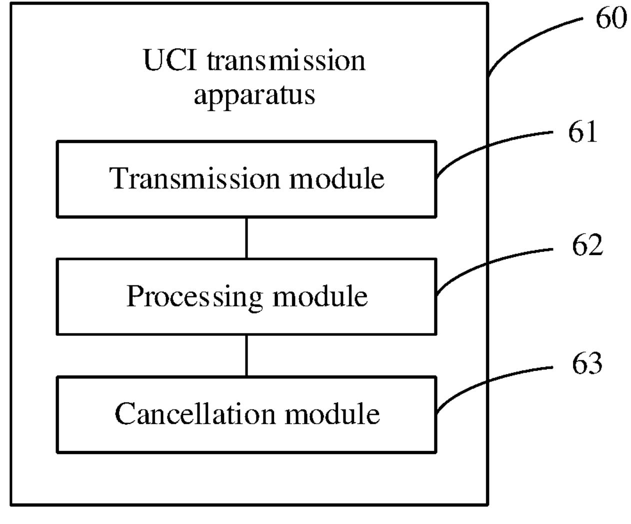
FIG. 7 is a third schematic structural diagram of a UCI transmission apparatus according to an embodiment of this application.
FIG. 8 is a schematic structural diagram of a communications device according to an embodiment of this application.

In a possible implementation, with reference to FIG. 5, as shown in FIG. 7, the UCI transmission apparatus 60 provided in embodiments of this application may further include a cancellation module 63. The cancellation module 63 is configured to: in a case that a third condition is met, cancel UCI transmission on a first uplink channel.

In a possible implementation, the third condition includes: the target multiplexing mode is allowing multiplexing between PUCCHs with different priorities; the N uplink channels include X PUCCHs and Y PUSCHs, where X is a positive integer, and Y is a positive integer; and the X PUCCHs do not include a high-priority PUCCH, and the Y PUSCHs include a high-priority PUSCH, where the first uplink channel is the X PUCCHs.

In a possible implementation, the third condition includes: the target multiplexing mode is allowing multiplexing between PUCCHs and PUSCHs with different priorities; and the N uplink channels include only X PUCCHs, where the first uplink channel is a low-priority PUCCH of the X PUCCHs.

According to the UCI transmission apparatus provided in embodiments of this application, during transmission of a service of the UCI transmission apparatus, in a case that N uplink channels overlap on a time domain resource because another service needs to be transmitted, the UCI transmission apparatus may transmit M pieces of UCI on a target uplink channel in the N uplink channels that is determined based on priorities of the N uplink channels (and/or channel types of the N uplink channels), without canceling transmission of UCI of a specific service, so that UCI transmission reliability of the UCI transmission apparatus can be improved.

The UCI transmission apparatus in embodiments of this application may be an apparatus, or an apparatus or an electronic device with an operating system, or may be a component, an integrated circuit, or a chip in a terminal. The apparatus or the electronic device may be a mobile terminal or a non-mobile terminal. For example, the mobile terminal may include but is not limited to the aforementioned types of the terminal 11, and the non-mobile terminal may be a server, a network attached storage (NAS), a personal computer (PC), a television (TV), a teller machine, a self-service machine, or the like. This is not specifically limited in embodiments of this application.

The UCI transmission apparatus provided in embodiments of this application is capable of implementing the processes implemented in the method embodiments of FIG. 1 to FIG. 4, with the same technical effects achieved. To avoid repetition, details are not described herein again.

Optionally, as shown in FIG. 8, an embodiment of this application further provides a communications device 70, including a processor 71, a memory 72 and a program or instructions stored in the memory 72 and executable on the processor 71. For example, in a case that the communications device 70 is UE, when the program or instructions are executed by the processor 71, the processes of embodiments of the UCI transmission method are implemented, with the same technical effects achieved.

Figure 9:
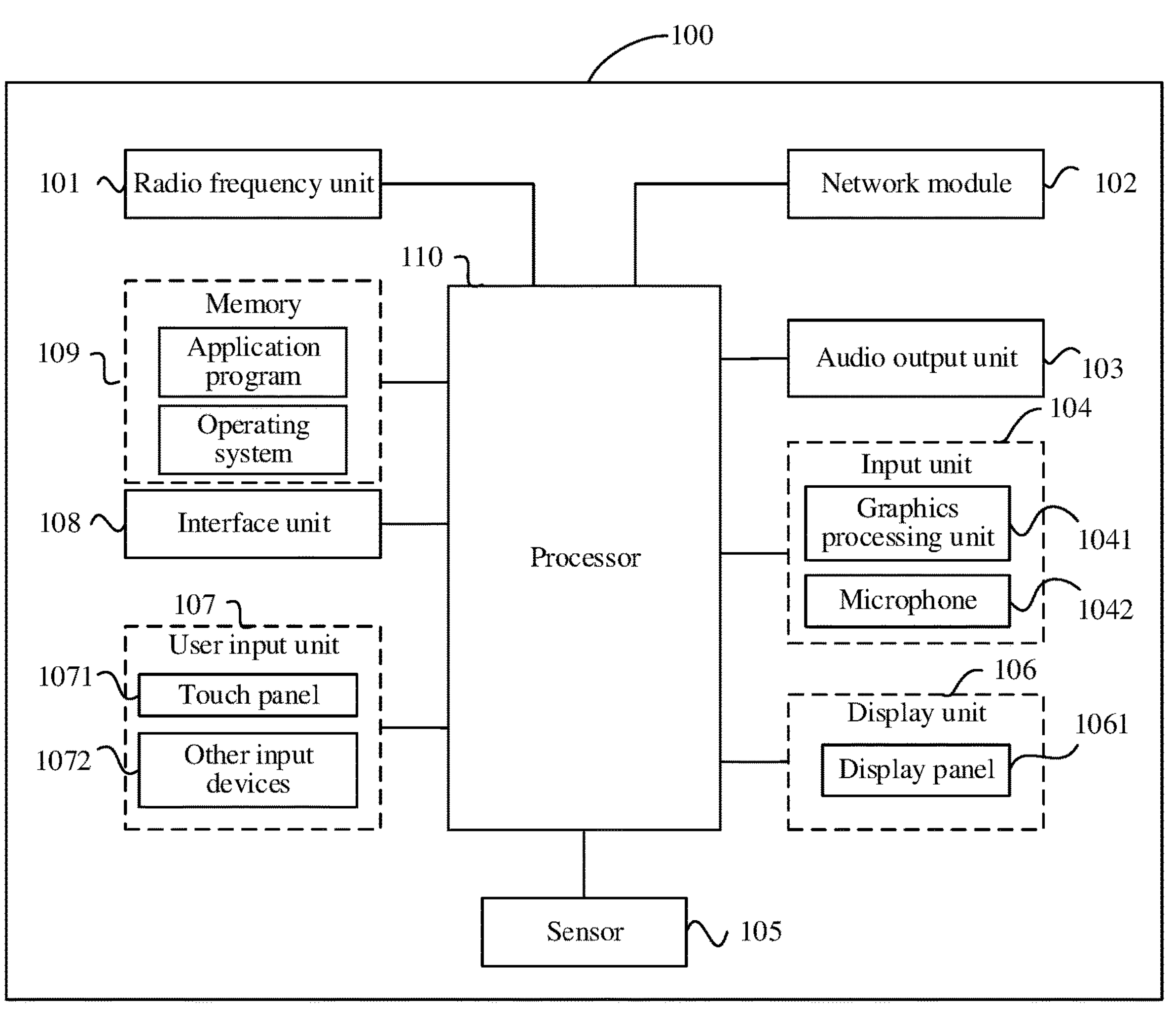
FIG. 9 is a schematic diagram of a hardware structure of a terminal according to an embodiment of this application.

An embodiment of this application further provides a terminal, including a processor and a communications interface, where the communications interface is configured to: in a case that N uplink channels overlap on a time domain resource, transmit M pieces of UCI to-be-carried on the N uplink channels on a target uplink channel in the N uplink channels, where both N and M are positive integers; and the target uplink channel is determined based on at least one of the following: priorities of the N uplink channels, or channel types of the N uplink channels. The terminal embodiment corresponds to the foregoing UE-side method embodiments, and all implementation processes and implementations of the foregoing method embodiments are applicable to the terminal embodiment, with the same technical effects achieved. In some embodiments, FIG. 9 is a schematic diagram of a hardware structure of a terminal for implementing an embodiment of this application.

The terminal 100 includes but is not limited to at least some of the following components: a radio frequency unit 101, a network module 102, an audio output unit 103, an input unit 104, a sensor 105, a display unit 106, a user input unit 107, an interface unit 108, a memory 109, a processor 110, and the like.

Persons skilled in the art can understand that the terminal 100 may further include a power supply (for example, a battery) that supplies power to each component. The power supply may be logically connected to the processor 110 by using a power management system, to implement functions such as charging management, discharging management, and power consumption management by using the power management system. The terminal structure shown in FIG. 9 does not constitute a limitation on the terminal. The terminal may include more or fewer components than those shown in the figure, or some components may be combined, or there may be a different component layout. Details are not described herein again.

It should be understood that, in embodiments of this application, the input unit 104 may include a graphics processing unit (GPU) 1041 and a microphone 1042. The graphics processing unit 1041 processes image data of a static picture or a video that is obtained by an image capture apparatus (for example, a camera) in a video capture mode or an image capture mode. The display unit 106 may include a display panel 1061. The display panel 1061 may be configured in a form of a liquid crystal display, an organic light-emitting diode, or the like. The user input unit 107 includes a touch panel 1071 and other input devices 1072. The touch panel 1071 is also referred to as a touchscreen. The touch panel 1071 may include two parts: a touch detection apparatus and a touch controller. The other input devices 1072 may include but are not limited to a physical keyboard, a function key (such as a volume control key or an on/off key), a trackball, a mouse, and a joystick. Details are not described herein.

In embodiments of this application, the radio frequency unit 101 receives downlink data from a network side device and then transmits the downlink data to the processor 110 for processing; and transmits uplink data to the network side device. Usually, the radio frequency unit 101 includes but is not limited to an antenna, at least one amplifier, a transceiver, a coupler, a low noise amplifier, a duplexer, and the like.

The memory 109 may be configured to store software programs or instructions and various data. The memory 109 may mainly include a program or instruction storage region and a data storage region. The program or instruction storage region may store an operating system, an application program or instructions required by at least one function (for example, an audio play function or an image play function), and the like. In addition, the memory 109 may include a high-speed random access memory, or may include a non-volatile memory, where the non-volatile memory may be a read-only memory (ROM), a programmable read-only memory (PROM), an erasable programmable read-only memory (EPROM), an electrically erasable programmable read-only memory (EEPROM), or a flash memory, for example, at least one magnetic disk storage device, a flash memory, or another non-volatile solid-state storage device.

The processor 110 may include one or more processing units. Optionally, the processor 110 may integrate an application processor and a modem processor. The application processor mainly processes an operating system, a user interface, an application program or instructions, and the like. The modem processor mainly processes wireless communication, for example, a baseband processor. It can be understood that the modem processor may alternatively be not integrated in the processor 110.

The radio frequency unit 101 is configured to: in a case that N uplink channels overlap on a time domain resource, transmit M pieces of UCI to-be-carried on the N uplink channels on a target uplink channel in the N uplink channels, where both N and M are positive integers; and the target uplink channel is determined based on at least one of the following: priorities of the N uplink channels, or channel types of the N uplink channels.

According to the terminal provided in embodiments of this application, during transmission of a service of the terminal, in a case that N uplink channels overlap on a time domain resource because another service needs to be transmitted, the terminal may transmit M pieces of UCIs on a target uplink channel in the N uplink channels that is determined based on priorities of the N uplink channels (and/or channel types of the N uplink channels), without canceling transmission of UCI of a specific service, so that UCI transmission reliability of the terminal can be improved.

Optionally, in embodiments of this application, the processor 110 is configured to: in a case that the N uplink channels include a PUCCH, multiplex first UCI on the target uplink channel in a target multiplexing mode, where the first UCI includes UCI with a same type in the M pieces of UCI; the target multiplexing mode is configured by a network side device; and the target multiplexing mode includes at least one of the following: allowing multiplexing between PUCCHs with different priorities, or allowing multiplexing between PUCCHs and PUSCHs with different priorities.

It can be learned that, in a case that the N uplink channels include a PUCCH, the terminal may multiplex UCI with a same type in the M pieces of UCI on the target uplink channel in a mode in which multiplexing between PUCCHs with different priorities is allowed (and/or multiplexing between PUCCHs and PUSCHs with different priorities is allowed), without canceling transmission of UCI of a specific service. This can reduce impact on a low-priority service while ensuring transmission of a high-priority service. In this way, service reliability of the terminal can be improved.

Optionally, in embodiments of this application, the first UCI includes a first HARQ-ACK to-be-carried on a high-priority uplink channel, a second HARQ-ACK to-be-carried on a low-priority uplink channel, and a CSI-part 1 to-be-carried on the low-priority uplink channel, and the target uplink channel is a low-priority PUSCH.

The processor 110 is configured to: in a case that a first condition is met, map the first HARQ-ACK according to a default mapping rule, and map the second HARQ-ACK according to the first rule based on the CSI-part 1.

It can be learned that, because the terminal can map different UCI according to different rules in a case that the first UCI includes different UCI of different UCI types, service reliability of the terminal can be improved.

Optionally, in embodiments of this application, the processor 110 is further configured to: in a case that a second condition is met, adjust a puncture formula to A bits, and map the first HARQ-ACK and second HARQ-ACK based on an adjusted puncture formula, where the first T bits of the A bits are used for mapping the first HARQ-ACK, the last P bits are used for mapping the second HARQ-ACK, and A, T and P are all positive integers.

It can be learned that, because the terminal can map different UCI according to different rules in a case that the first UCI includes different UCI of different UCI types, service reliability of the terminal can be improved.

Optionally, in embodiments of this application, the processor 110 is further configured to: in a case that a third condition is met, cancel UCI transmission on a first uplink channel.

It can be learned that, in a case that the N uplink channels include a PUCCH and the third condition is met, the terminal may cancel UCI transmission on the first uplink channel, so that transmission of a high-priority service can be ensured. In this way, user experience of using a service can be improved.

An embodiment of this application further provides a non-transitory readable storage medium. The non-transitory readable storage medium stores a program or instructions.

When the program or instructions are executed by a processor, the processes of embodiments of the UCI transmission method are implemented, with the same technical effects achieved. To avoid repetition, details are not described herein again.

The processor is a processor in the terminal in the foregoing embodiments. The non-transitory readable storage medium includes a non-transitory computer-readable storage medium, such as a computer read-only memory (ROM), a random access memory (RAM), a magnetic disk, or an optical disc.

An embodiment of this application further provides a chip. The chip includes a processor and a communications interface. The communications interface is coupled to the processor. The processor is configured to run a program or instructions, to implement the processes of embodiments of the UCI transmission method, with the same technical effects achieved. To avoid repetition, details are not described herein again.

It should be understood that the chip provided in embodiments of this application may also be referred to as a system-level chip, a system on chip, a chip system, a system-on-a-chip, or the like.

It should be noted that the terms "include", "comprise", or any other variation thereof in this specification are intended to cover a non-exclusive inclusion, so that a process, a method, an object, or an apparatus that includes a list of elements not only includes those elements but also includes other elements that are not expressly listed, or further includes elements inherent to such a process, method, object, or apparatus. In absence of more constraints, an element preceded by "includes a . . . " does not preclude the existence of other identical elements in the process, method, article, or apparatus that includes the element. In addition, it should be noted that the scope of the method and apparatus in the implementations of this application is not limited to performing functions in the shown or described order, but may also include performing functions in a substantially simultaneous manner or in a reverse order depending on the functions involved. For example, the described method may be performed in an order different from that described, and steps may be added, omitted, or combined. In addition, features described with reference to some examples may be combined in other examples.

According to the foregoing descriptions of the implementations, persons skilled in the art can clearly understand that the methods in the foregoing embodiments may be implemented by using software in combination with a necessary common hardware platform, or certainly may be implemented by using hardware. However, in most cases, the former is a preferred implementation. Based on such an understanding, the technical solutions of this application essentially or the part contributing to the conventional technology may be implemented in a form of a computer software product. The computer software product may be stored in a storage medium (for example, a ROM/RAM, a magnetic disk, or a compact disc), and includes several instructions for instructing a terminal (which may be a mobile phone, a computer, a server, an air conditioner, a network device, or the like) to perform the methods in embodiments of this application.

The foregoing describes embodiments of this application with reference to the accompanying drawings. However, this application is not limited to the foregoing implementations. The foregoing implementations are merely illustrative rather than restrictive.

As instructed by this application, persons of ordinary skill in the art may develop many other manners without departing from principles of this application and the protection scope of the claims, and all such manners fall within the protection scope of this application.

What is claimed is:

1. An uplink control information transmission method, wherein the method comprises:

in a case that N uplink channels overlap on a time domain resource, and that the N uplink channels comprise X physical uplink control channels (PUCCHs) and Y physical uplink shared channels (PUSCHs), determining, by user equipment (UE), a high-priority PUSCH or a low-priority PUSCH of the Y PUSCHs as a target uplink channel, wherein both X and Y are positive integers; and transmitting, the UE, M pieces of uplink control information (UCI) to-be-carried on the N uplink channels on the target uplink channel; and wherein in a case that the X PUCCHs comprise a low-priority PUCCH and a high-priority PUCCH, and the Y PUSCHs comprise a high-priority PUSCH, the target uplink channel is the high-priority PUSCH; and in a case that the M pieces of UCI comprises a first hybrid automatic repeat request acknowledgement (HARQ-ACK) to-be-carried on a high-priority uplink channel, a second HARQ-ACK to-be-carried on a low-priority uplink channel, and channel state information (CSI) to-be-carried on the high-priority uplink channel, and that the target uplink channel is a high-priority PUSCH, before the transmitting, by the UE, M pieces of UCI to-be-carried on the N uplink channels on the target uplink channel, the method further comprises:

mapping, by the UE, the first HARQ-ACK and a high-priority CSI in a target multiplexing mode according to a default mapping rule, and discarding the second HARQ-ACK.

2. The method according to claim 1, wherein the target multiplexing mode comprises at least one of following: allowing multiplexing between PUCCHs with different priorities, or allowing multiplexing between PUCCHs and PUSCHs with different priorities.

3. The method according to claim 1, wherein the method further comprises:

in a case that a second condition is met, adjusting, by the UE, a puncture formula to A bits, and mapping the first HARQ-ACK and the second HARQ-ACK based on an adjusted puncture formula, wherein the first T bits of the A bits are used for mapping the first HARQ-ACK, the last P bits are used for mapping the second HARQ-ACK, and A, T and P are all positive integers.

4. The method according to claim 1, wherein before the transmitting, by the UE, M pieces of UCI to-be-carried on the N uplink channels on the target uplink channel, the method further comprises:

in a case that a third condition is met, canceling, by the UE, UCI transmission on a first uplink channel.

5. The method according to claim 4, wherein the third condition comprises:

the target multiplexing mode is allowing multiplexing between PUCCHs with different priorities; and the X PUCCHs do not comprise a high-priority PUCCH, and the Y PUSCHs comprise a high-priority PUSCH, wherein the first uplink channel is the X PUCCHs.

6. A UE, comprising a processor, a memory, and a program or instructions stored in the memory and executable on the processor, wherein the program or instructions, when executed by the processor, causes the UE to perform:

in a case that N uplink channels overlap on a time domain resource, and that the N uplink channels comprise X physical uplink control channels (PUCCHs) and Y physical uplink shared channels (PUSCHs), determining, a high-priority PUSCH or a low-priority PUSCH of the Y PUSCHs as a target uplink channel, wherein both X and Y are positive integers; and transmitting M pieces of uplink control information (UCI) to-be-carried on the N uplink channels the target uplink channel, wherein both N and M are positive integers in a case that the X PUCCHs comprise a low-priority PUCCH and a high-priority PUCCH, and the Y PUSCHs comprise a high-priority PUSCH, the target uplink channel is the high-priority PUSCH; and the program or instructions, when executed by the processor, causes the UE to further perform:

in a case that the M pieces of UCI comprises a first hybrid automatic repeat request acknowledgement (HARQ-ACK) to-be-carried on a high-priority uplink channel, a second HARQ-ACK to-be-carried on a low-priority uplink channel, and channel state information (CSI) to-be-carried on the high-priority uplink channel, and that the target uplink channel is a high-priority PUSCH, mapping the first HARQ-ACK and a high-priority CSI in a target multiplexing mode according to a default mapping rule, and discarding the second HARQ-ACK.

7. The UE according to claim 6, wherein the target multiplexing mode comprises at least one of following: allowing multiplexing between PUCCHs with different priorities, or allowing multiplexing between PUCCHs and PUSCHs with different priorities.

8. The UE according to claim 7, wherein the program or instructions, when executed by the processor, causes the UE to further perform:

in a case that a second condition is met, adjusting a puncture formula to A bits, and mapping the first HARQ-ACK and the second HARQ-ACK based on an adjusted puncture formula, wherein the first T bits of the A bits are used for mapping the first HARQ-ACK, the last P bits are used for mapping the second HARQ-ACK, and A, T and P are all positive integers.

9. The UE according to claim 6, wherein the program or instructions, when executed by the processor, causes the UE to further perform:

in a case that a third condition is met, canceling UCI transmission on a first uplink channel.

10. The UE according to claim 9, wherein the third condition comprises:

the target multiplexing mode is allowing multiplexing between PUCCHs with different priorities; and the X PUCCHs do not comprise a high-priority PUCCH, and the Y PUSCHs comprise a high-priority PUSCH, wherein the first uplink channel is the X PUCCHs.

11. A non-transitory readable storage medium, wherein the non-transitory readable storage medium stores a program or instructions, and the program or instructions, when executed by a processor of a UE, causes the UE to perform:

in a case that N uplink channels overlap on a time domain resource, and that the N uplink channels comprise X physical uplink control channels (PUCCHs) and Y physical uplink shared channels (PUSCHs), determining, by user equipment (UE), a high-priority PUSCH or a low-priority PUSCH of the Y PUSCHs as a target uplink channel, wherein both X and Y are positive integers; and transmitting M pieces of uplink control information (UCI) to-be-carried on the N uplink channels on the target uplink channel, wherein both N and M are positive integers wherein in a case that the X PUCCHs comprise a low-priority PUCCH and a high-priority PUCCH, and the Y PUSCHs comprise a high-priority PUSCH, the target uplink channel is the high-priority PUSCH; and the program or instructions, when executed by the processor of the UE, causes the UE to further perform:

in a case that the M pieces of UCI comprises a first hybrid automatic repeat request acknowledgement (HARQ-ACK) to-be-carried on a high-priority uplink channel, a second HARQ-ACK to-be-carried on a low-priority uplink channel, and channel state information (CSI) to-be-carried on the high-priority uplink channel, and that the target uplink channel is a high- priority PUSCH, mapping the first HARQ-ACK and a high-priority CSI in a target multiplexing mode according to a default mapping rule, and discarding the second HARQ-ACK.

12. The non-transitory readable storage medium according to claim 11, wherein the target multiplexing mode comprises at least one of following: allowing multiplexing between PUCCHs with different priorities, or allowing multiplexing between PUCCHs and PUSCHs with different priorities.

13. The non-transitory readable storage medium according to claim 11, wherein the program or instructions, when executed by the processor of the UE, causes the UE to further perform:

in a case that a second condition is met, adjusting a puncture formula to A bits, and mapping the first HARQ-ACK and the second HARQ-ACK based on an adjusted puncture formula, wherein the first T bits of the A bits are used for mapping the first HARQ-ACK, the last P bits are used for mapping the second HARQ-ACK, and A, T and P are all positive integers.

14. The non-transitory readable storage medium according to claim 11, wherein the program or instructions, when executed by the processor of the UE, causes the UE to further perform:

in a case that a third condition is met, canceling UCI transmission on a first uplink channel.

15. The non-transitory readable storage medium according to claim 14, wherein the third condition comprises:

the target multiplexing mode is allowing multiplexing between PUCCHs with different priorities; and the X PUCCHs do not comprise a high-priority PUCCH, and the Y PUSCHs comprise a high-priority PUSCH, wherein the first uplink channel is the X PUCCHs.

* * * * *